US010935385B2

(12) United States Patent
Ohyama et al.

(10) Patent No.: US 10,935,385 B2
(45) Date of Patent: Mar. 2, 2021

(54) INFORMATION PROCESSING APPARATUS, VEHICLE, INFORMATION PROCESSING METHOD, RUNNING CONTROL METHOD, AND MAP UPDATING METHOD

(71) Applicant: Panasonic Intellectual Property Corporation of America, Torrance, CA (US)

(72) Inventors: Shinji Ohyama, Osaka (JP); Yohei Nakata, Osaka (JP); Takuya Yamaguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/045,858

(22) Filed: Jul. 26, 2018

(65) Prior Publication Data
US 2019/0063929 A1 Feb. 28, 2019

(30) Foreign Application Priority Data

Aug. 28, 2017 (JP) .............................. JP2017-163739
Apr. 10, 2018 (JP) .............................. JP2018-075712

(51) Int. Cl.
*G01C 21/32* (2006.01)
*G05D 1/02* (2020.01)
*G01S 17/42* (2006.01)

(52) U.S. Cl.
CPC ............. *G01C 21/32* (2013.01); *G05D 1/021* (2013.01); *G01S 17/42* (2013.01); *G05D 2201/0213* (2013.01)

(58) Field of Classification Search
USPC .......................................................... 701/23
See application file for complete search history.

(56) References Cited

U.S. PATENT DOCUMENTS 5,994,570 A * 11/1999 Ogawa ................ C07F 15/0086
502/158
7,769,544 B2 * 8/2010 Blesener ................ B61L 29/28
701/301

(Continued)

FOREIGN PATENT DOCUMENTS

JP 2016-153832 8/2016
JP 2016-156973 9/2016

OTHER PUBLICATIONS

The Extended European Search Report dated Feb. 27, 2019 for European Patent Application No. 18183505.9.

(Continued)

*Primary Examiner* — Jean Paul Cass
(74) *Attorney, Agent, or Firm* — Greenblum & Bernstein, P.L.C.

(57) ABSTRACT

An information processing apparatus is configured to distribute, to a vehicle, a map showing a road shape of a road on which the vehicle runs makes, for each of a plurality of areas and determine whether it is necessary to update the map of that area. The determination is based on at least either an amount of change from the road shape shown by the map to the road shape at a present time in each of the plurality of areas or the number of occurrences of a predetermined action of a vehicle having run through in each of the plurality of areas.

19 Claims, 14 Drawing Sheets

(56) References Cited

U.S. PATENT DOCUMENTS

| | | | | |
|---|---|---|---|---|
| 7,979,172 B2* | 7/2011 | Breed | ............ | G08G 1/161 701/23 |
| 8,571,722 B2* | 10/2013 | Samples | ......... | G08G 1/096844 701/1 |
| 8,983,738 B2* | 3/2015 | Avitzur | ............ | E02F 9/205 701/50 |
| 9,103,671 B1* | 8/2015 | Breed | ............ | G01S 13/931 |
| 9,141,107 B2* | 9/2015 | Ferguson | ............ | B60W 10/20 |
| 10,232,856 B2* | 3/2019 | Khalifeh | ............ | H04W 4/80 |
| 2005/0278098 A1* | 12/2005 | Breed | ............ | G01S 13/931 701/45 |
| 2007/0109111 A1* | 5/2007 | Breed | ............ | G08G 1/166 340/435 |
| 2007/0213922 A1* | 9/2007 | Van Buer | ............ | H04W 4/44 701/117 |
| 2008/0015771 A1* | 1/2008 | Breed | ............ | B60W 50/00 701/300 |
| 2008/0040004 A1* | 2/2008 | Breed | ............ | B60R 21/0134 701/45 |
| 2008/0040029 A1* | 2/2008 | Breed | ............ | G01S 19/50 701/514 |
| 2008/0042815 A1* | 2/2008 | Breed | ............ | G08G 1/164 340/435 |
| 2008/0046150 A1* | 2/2008 | Breed | ............ | B60R 21/0134 701/45 |
| 2008/0106436 A1* | 5/2008 | Breed | ............ | G08G 1/166 340/905 |
| 2008/0133136 A1* | 6/2008 | Breed | ............ | B60W 50/00 701/301 |
| 2008/0140318 A1* | 6/2008 | Breed | ............ | G05D 1/0246 702/3 |
| 2008/0147253 A1* | 6/2008 | Breed | ............ | G01S 17/93 701/3 |
| 2008/0150786 A1* | 6/2008 | Breed | ............ | G01S 19/42 342/53 |
| 2008/0154495 A1* | 6/2008 | Breed | ............ | G01C 21/20 701/472 |
| 2008/0154629 A1* | 6/2008 | Breed | ............ | B60N 2/2863 705/1.1 |
| 2008/0161986 A1* | 7/2008 | Breed | ............ | G01S 19/07 701/23 |
| 2013/0024548 A1* | 1/2013 | Obara | ............ | G01C 21/32 709/219 |
| 2013/0304513 A1* | 11/2013 | Hyde | ............ | G06Q 40/08 705/4 |
| 2017/0122749 A1* | 5/2017 | Urano | ............ | G01C 21/30 |
| 2018/0149487 A1* | 5/2018 | Lee | ............ | G06F 16/23 |
| 2018/0188045 A1* | 7/2018 | Wheeler | ............ | G06K 9/00791 |
| 2018/0217612 A1* | 8/2018 | Vladimerou | ............ | G01C 21/32 |
| 2018/0345962 A1* | 12/2018 | Konishi | ............ | B60W 10/04 |
| 2019/0347249 A1* | 11/2019 | Sekiguchi | ............ | G06F 16/23 |

OTHER PUBLICATIONS

A. K. Aijazi et al., "Detecting and Updating Changes in Lidar Point Clouds for Automatic 3D Urban Cartography", ISPRS Ann. Photogramm. Remote Sens. Spatial Inf. Sci., II-5/W2, Nov. 11, 2013, pp. 7-12, http://www.isprs-ann-photogramm-remote-sens-spatial-inf-sci.net/II-5-W2/7/2013/isprsannals-II-5-W2-7-2013.pdf.

* cited by examiner

FIG. 7A

| VEHICLE ID | PREDETERMINED ACTION | TIME OF OCCURRENCE | AREA OF OCCURRENCE |
|---|---|---|---|
| C001 | SUDDEN DECELERATION | 10:48 04/27/2017; ** | A3 |
| C002 | MANUAL DRIVING INTERRUPTION | 11:03 04/27/2017; ** | B3 |
| C003 | SUDDEN ACCELERATION | 11:21 04/27/2017; ** | C4 |
| C001 | QUICK AVOIDANCE | 9:47 04/28/2017; ** | B3 |
| C001 | SUDDEN ACCELERATION | 9:48 04/28/2017; ** | B3 |
| ⋮ | ⋮ | ⋮ | ⋮ |

FIG. 7B

| VEHICLE ID | VEHICLE HEIGHT | SENSOR ACCURACY | NUMBER OF RUNNINGS |
|---|---|---|---|
| C001 | HIGH | HIGH | 13 |
| C002 | LOW | MEDIUM | 2 |
| C003 | LOW | LOW | 0 |
| C004 | MEDIUM | UNKNOWN | 0 |
| C005 | HIGH | MEDIUM | 5 |
| ⋮ | ⋮ | ⋮ | ⋮ |

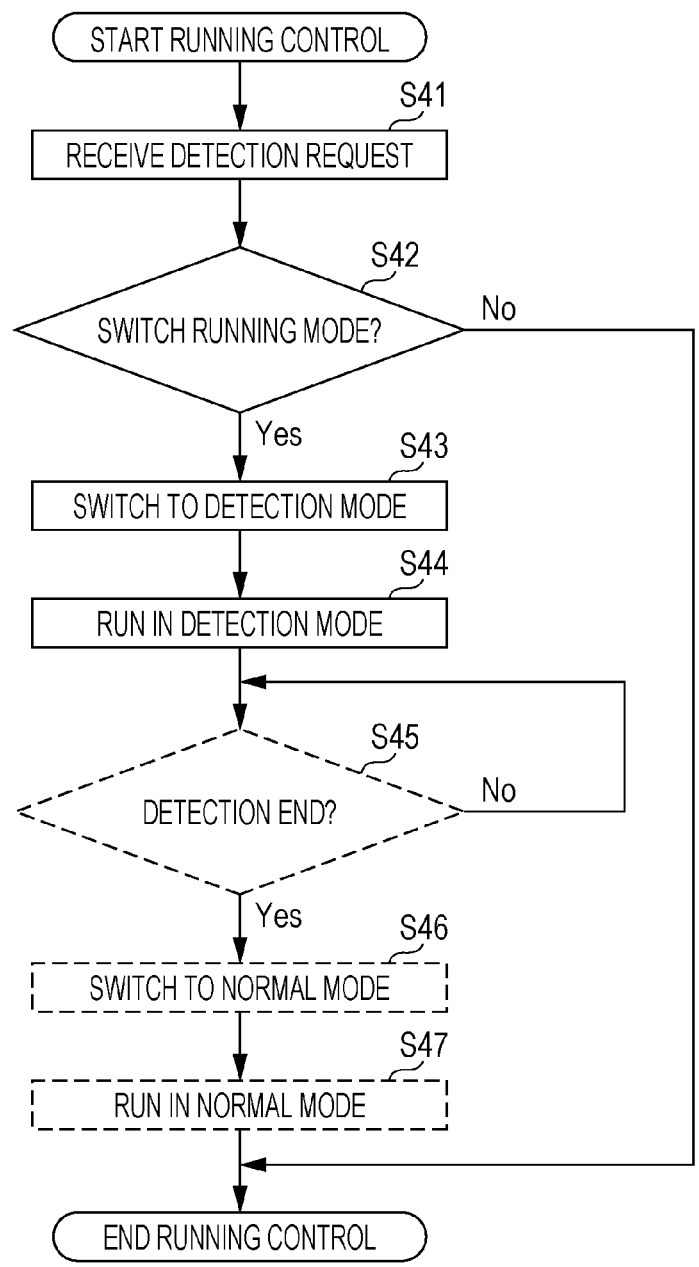

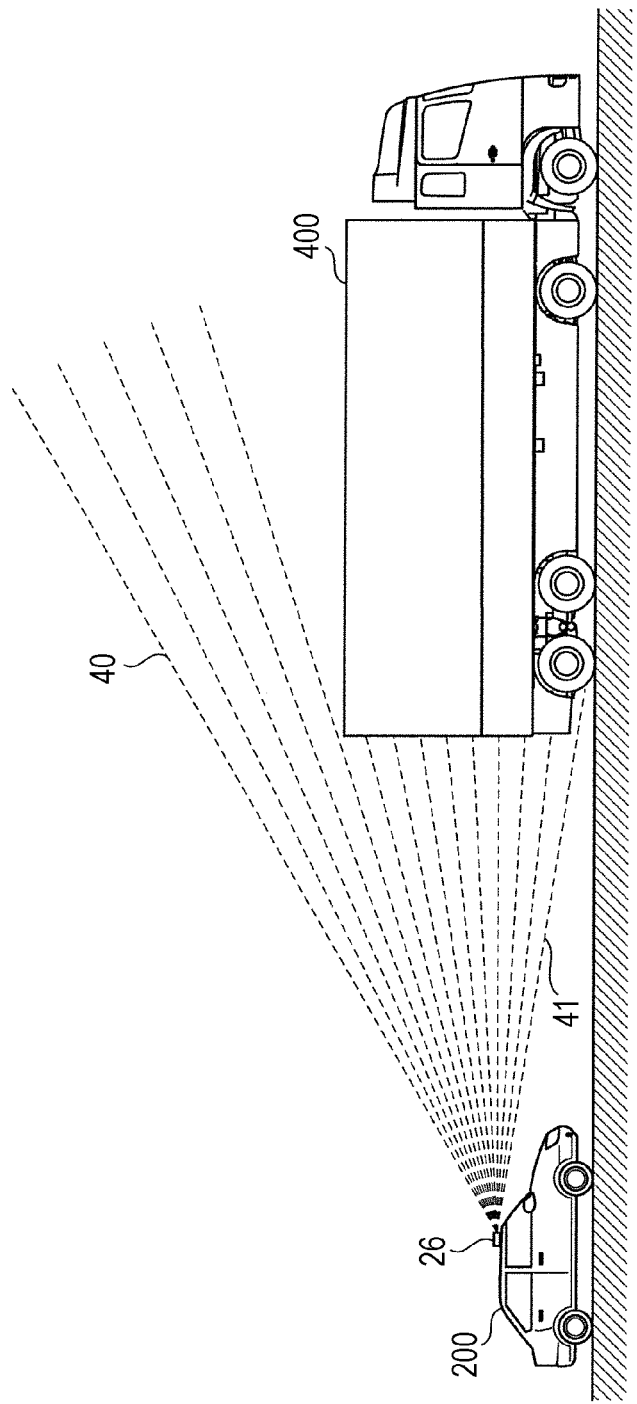

INFORMATION PROCESSING APPARATUS, VEHICLE, INFORMATION PROCESSING METHOD, RUNNING CONTROL METHOD, AND MAP UPDATING METHOD

BACKGROUND

1. Technical Field

The present disclosure relates to an information processing apparatus, a vehicle, an information processing method, a running control method, and a map updating method for updating map data.

2. Description of the Related Art

Conventionally, as disclosed in Japanese Unexamined Patent Application Publication No. 2016-156973, Japanese Unexamined Patent Application Publication No. 2016-153832, and A. K. Aijazi, P. Checchin, and L. Trassouldaine, "Detecting and Updating Changes in Lidar Point Clouds for Automatic 3D Urban Cartography", ISPRS Ann. Photogramm. Remote Sens. Spatial Inf. Sci., II-5/W2, 7-12, 2013, http://www.isprs-ann-photogramm-remote-sens-spatial-inf-sci.net/II-5-W2/7/2013/isprsannals-II-5-W2-7-2013.pdf, there have been known technologies for updating map data with use of data acquired by a sensor situated on board a vehicle.

SUMMARY

However, the conventional technologies have difficulty in updating map data so that it becomes more accurate.

One non-limiting and exemplary embodiment provides an information processing apparatus, a vehicle, and the like that make it possible to effectively update map data so that it becomes more accurate.

In one general aspect, the techniques disclosed here feature an information processing apparatus for distributing, to a vehicle, a map showing a road on which the vehicle runs and a road shape that is a shape of an area around the road, including: a processor; and a non-transitory recording medium storing thereon (i) the map divided into a plurality of areas and (ii) a computer program, which when executed by the processor, causes the processor to perform operations including: determining, for each of the plurality of areas, whether it is necessary to update the map of that area, the determining being based on at least either an amount of change from the road shape shown by the map to the road shape of a present time or the number of occurrences of a predetermined action of a vehicle having run through that area.

An information processing apparatus, a vehicle, and the like according to the present disclosure make it possible to effectively update map data so that it becomes more accurate.

It should be noted that general or specific embodiments may be implemented as a system, a method, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7A is a diagram showing an example of an event history database;

FIG. 7B is a diagram showing an example of a vehicle database;

FIG. 11 is a flow chart showing a detailed example of running control according to the embodiment;

FIG. 12 is a diagram for explaining an effect that is brought about by running at a larger intervehicular distance in the detection mode;

DETAILED DESCRIPTION

Figure 1:
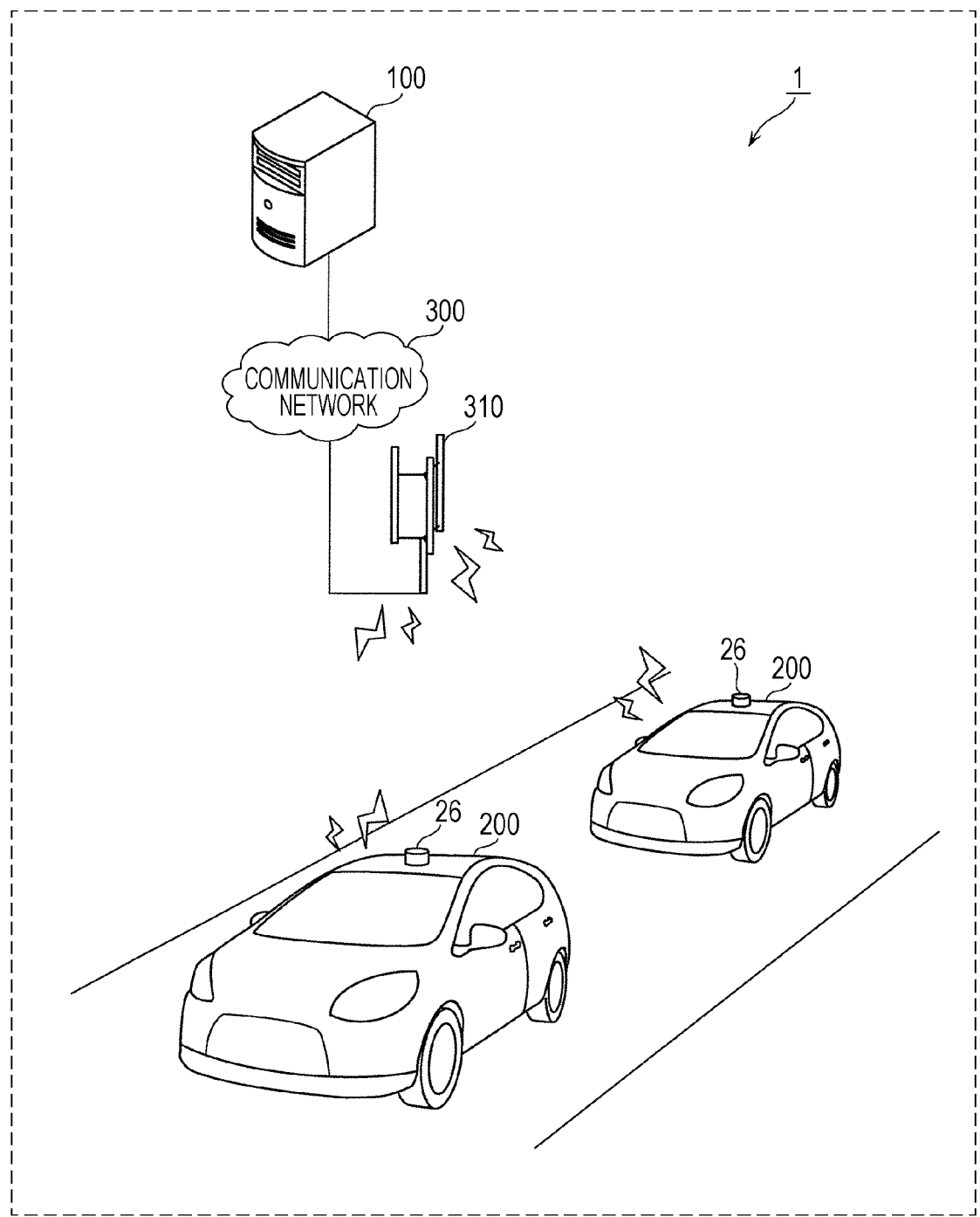
FIG. 1 is a schematic view of a map updating system according to an embodiment.

Underlying Knowledge Forming Basis of the Present Disclosure

The inventors found that the following problems arise regarding the map updating systems described in section "BACKGROUND".

Japanese Unexamined Patent Application Publication No. 2016-156973 discloses a map system including a server that manages map data and a vehicle mounted with a sensor. In this system, the vehicle detects a point of change in environment from a comparison between data acquired from the sensor and the map data, and the server acquires data on the point of change and sensor accuracy information at the time of detection of the point of change from the vehicle, whereby the map data is updated by assigning a weight to the point-of-change data according to the sensor accuracy information.

Further, as with Japanese Unexamined Patent Application Publication No. 2016-156973, Japanese Unexamined Patent Application Publication No. 2016-153832 discloses a system that updates map data by assigning weights to points of change on the basis of the amount of traffic in an area through which the vehicle has run.

Further, A. K. Aijazi, P. Checchin, and L. Trassouldaine, "Detecting and Updating Changes in Lidar Point Clouds for Automatic 3D Urban Cartography", ISPRS Ann. Photogramm. Remote Sens. Spatial Inf. Sci., II-5/W2, 7-12, 2013, http://www.isprs-ann-photogramm-remote-sens-spatial-inf-sci.net/II-5-W2/7/2013/isprsannals-II-5-W2-7-2013.pdf discloses detecting a point of change in environment from a comparison between LiDAR (light detection and ranging) observation data and a map divided in gridlike fashion and calculating the variance of each point of change from multiple observations. Moreover, A. K. Aijazi, P. Checchin, and L. Trassouldaine, "Detecting and Updating Changes in Lidar Point Clouds for Automatic 3D Urban Cartography", ISPRS Ann. Photogramm. Remote Sens. Spatial Inf. Sci., II-5/W2, 7-12, 2013, http://www.isprs-ann-photogramm-remote-sens-spatial-inf-sci.net/II-5-W2/7/2013/isprsannals-II-5-W2-7-2013.pdf discloses an algorithm that, with use of a result of calculation of the variance of each point of change, a change in environment that is estimated to be temporary is not reflected in map updating and only a change that is estimated to be permanent is reflected in map updating, and discloses a result of application to actual data.

The technologies disclosed in these documents are undesirably excessive in data communication in an area with a large amount of traffic and insufficient in update data in an area with a small amount of traffic, as the amount of data that is collected by the server depends on the amount of traffic in each map area. In particular, since the volume of detection data that is obtained by a LiDAR or a camera is large, unnecessary communication is often performed in an area with a large amount of traffic. Meanwhile, in an area with a small amount of traffic, detection data that is obtained by a LiDAR or a camera tends to be insufficient; therefore, even if there is a point of change on an actual road, the frequency of updates cannot be maintained and, accordingly, information freshness cannot be maintained. This forces the vehicle to run with a difference between the map data and a road on which it actually runs. Japanese Unexamined Patent Application Publication No. 2016-153832 discloses a method for maintaining the frequency of updates by increasing the weight of detection data obtained in an area with a small amount of traffic. However, this method undesirably sacrifices update reliability in a case where the accuracy of data detected is low.

Further, the technologies disclosed in the foregoing documents entail a risk of collecting low-accuracy detection data in collecting detection data from the vehicle's sensor. For example, since the vehicle detects its surroundings with the sensor while running, the accuracy with which the vehicle estimates its own position deteriorates due to vibration or sudden acceleration of the vehicle during sensor detection so that there is a possibility of deterioration in matching accuracy between detection data and map data. Further, in a case where the vehicle is approaching a large-sized vehicle while detecting data, occlusion occurs in LiDAR detection data to make it impossible to appropriately detect a surrounding situation. Japanese Unexamined Patent Application Publication No. 2016-156973 discloses a method for, according to an element responsible for sensor accuracy at the time of data detection, changing the weight of data detected. However, this method undesirably slow in updating, as only low weights are assigned in a situation where sensor accuracy is not stable.

In one general aspect, the techniques disclosed here feature an information processing apparatus for distributing, to a vehicle, a map showing a road on which the vehicle runs and a road shape that is a shape of an area around the road, including: a processor; and a non-transitory recording medium storing thereon (i) the map divided into a plurality of areas and (ii) a computer program, which when executed by the processor, causes the processor to perform operations including: determining, for each of the plurality of areas, whether it is necessary to update the map of that area, the determining being based on at least either an amount of change from the road shape shown by the map to the road shape of a present time or the number of occurrences of a predetermined action of a vehicle having run through that area.

According to this, the map is divided into the plurality of areas, and it is determined, for each of the plurality of areas, whether it is necessary to update the map. Thus, the information processing apparatus can efficiently determine an area where the map needs to be updated.

Further, the operations may further include: selecting, from among one or more vehicles that are running or planning to run in an area where it has been determined that the map needs to be updated, a detecting vehicle that detects the road shape; and transmitting, via a communication network to the detecting vehicle thus selected, a detection request that causes the detecting vehicle to detect the road shape of the area.

According to this, one or more vehicles are requested to detect detection data for an area where the map needs to be updated. Thus, since the information processing apparatus selectively transmits a detection request to a vehicle that is running or planning to run in an area where updating is needed, the information processing apparatus can effectively acquire accurate detection data. For this reason, the information processing apparatus can effectively update map data so that it becomes more accurate.

Further, the vehicle may be a vehicle that performs automatic driving, and the predetermined action may be at least one of sudden deceleration, sudden acceleration, manual driving interruption during the automatic driving, and quick avoidance that have occurred during a predetermined period of time up to the present time.

According to this, the information processing apparatus determines that a larger number of occurrences of predetermined actions in a vehicle that performs automatic driving lead to a greater difference between a road shape shown by a map and an actual road shape. This is because a difference between a road shape shown by a map and an actual road shape leads to deterioration in accuracy of estimation of the position of the vehicle, thus making stable running control difficult. Thus, since the information processing apparatus determines that a larger number of occurrences of predetermined actions in a vehicle that performs automatic driving lead to a greater difference between a road shape shown by a map and an actual road shape, the information processing apparatus can effectively determine whether it is necessary to update the map.

Further, the selecting may include selecting, as the detecting vehicle, a vehicle whose vehicle height is not lower than a predetermined height.

This makes it possible to select a vehicle that can detect the road shape with a high degree of accuracy.

Further, the selecting may include selecting, as the detecting vehicle, a vehicle having a sensor that detects the road shape and whose detection accuracy is not lower than a predetermined degree of accuracy.

This makes it possible to select a vehicle that can detect the road shape with a high degree of accuracy.

Further, the selecting may include selecting, as the detecting vehicle, a vehicle that has ever run in a detection mode in which to detect the road shape in order to update the map.

This makes it possible to select a vehicle that is highly likely to be able to run in the detection mode in which to detect the road shape with a high degree of accuracy. This makes it possible to reduce the time it takes to select a vehicle that run in the detection mode and the processing load.

Further, the determining may include: computing a score for each of the plurality of areas on the basis of at least either the amount of change or the number of occurrences; and determining that it is necessary to update the map of that one of the plurality of areas whose computed score exceeds a predetermined score.

This makes it possible to effectively and easily determine, for each of the plurality of areas, whether it is necessary to update the map of that area.

Further, the determining may include increasing the predetermined score of that one of the plurality of areas where the number of times it has been determined per unit period that updating is needed is not smaller than a first number of times and decreasing the predetermined score of that one of the plurality of areas where the number of times it has been determined per unit period that updating is needed is smaller than a second number of times that is not larger than the first number of times.

For this reason, an area with a greater time series variation in the road shape can be updated at a higher frequency. This makes it possible to update the map of the area at a frequency according to the time series variation in the road shape. This makes it possible to update the map of each of the plurality of areas at a frequency appropriate for that area.

In one general aspect, the techniques disclosed here feature a vehicle including: a processor; and a memory storing thereon a computer program, which when executed by the processor, causes the processor to perform operations including: detecting a road on which the vehicle runs and a road shape that is a shape of an area around the road; receiving, via a communication network from an external information processing apparatus, a detection request to detect the road shape; upon receiving the detection request, determining whether a running mode of the vehicle is switched from a normal mode in which to perform normal running to a detection mode in which to, in order to update the map, perform running that detects the road shape of a road on which the vehicle is running; in a case where it has been determined that switching to the detection mode is made, switching the running mode to the detection mode and controlling the vehicle to run in the detection mode; and in a case where it has been determined that switching to the detection mode is not made, keeping the running mode in the detection mode and controlling the vehicle to run in the normal mode.

According to this, since the vehicle runs in a detection mode, different from a normal mode, in which to detect a road shape for use in updating of a map, the vehicle can detect the road shape with a high degree of accuracy. Further, even upon receiving a detection request from an information processing apparatus, the vehicle keeps running in the normal mode without switching to the detection mode, depending on the situation of the vehicle; therefore, the vehicle can inhibit impairment of convenience for a user of the vehicle.

Further, the operation may further include: transmitting, via the communication network to the information processing apparatus, detection data indicating the road shape thus detected.

For this reason, the vehicle can transmit, to the information processing apparatus, detection data detected with a high degree of accuracy in an area where the map needs to be updated.

Further, the detection mode may be a running mode in which to run in a state of change in at least one of settings of making a maximum running speed lower, making a maximum running acceleration lower, making an intervehicular distance larger, or making a detection frequency higher than in the normal mode.

For this reason, the vehicle can detect the road shape with a high degree of accuracy in the detection mode.

Further, the operations may further include: detecting a following vehicle falling within a certain distance from the vehicle; and in a case where the running mode has been switched to the detection mode and the following vehicle has been detected, controlling the vehicle to run in the normal mode.

For this reason, even in a case where the running mode has been switched to the detection mode, the vehicle can run out of the way of a following vehicle in a case where the following vehicle has been detected.

Further, the operations may further include: detecting an occurrence of congestion in an area around the vehicle; and in a case where the running mode has been switched to the detection mode and the occurrence of congestion has been detected, controlling the vehicle to run in the normal mode.

For this reason, even in a case where the running mode has been switched to the detection mode, the vehicle can run out of the way of a stuck vehicle when the density of other vehicles is not lower than a predetermined density and congestion is taking place.

Further, the operations may further include receiving an input indicating whether to give approval to switch the running mode from the normal mode to the detection mode, and the determining may include, in a case where the input indicates approval, determining that the running mode is switched and, in a case where the input indicates disapproval, determining that the running mode is not switched.

For this reason, since, in the absence of approval from a person who is in the vehicle interior, the vehicle runs in the normal mode without switching the running mode, the vehicle can inhibit impairment of convenience for the person.

Further, the vehicle may be a vehicle that carries a passenger, and the determining may include, in a case where the vehicle is not on its way to pick up the passenger and the vehicle is not carrying the passenger, determining that the running mode is switched and, in a case where the vehicle is on its way to pick up the passenger or the vehicle is carrying the passenger, determining that the running mode is not switched.

For this reason, since, in a case where the vehicle is on its way to pick up the passenger or is carrying the passenger, the vehicle runs while keeping the running mode in the detection mode, the vehicle can inhibit impairment of convenience for the passenger.

In one general aspect, the techniques disclosed here feature a map updating method including updating a map in a map updating system including an information processing apparatus for distributing, to one or more vehicles, the map showing a road on which the one or more vehicles run and a road shape that is a shape of an area around the road and the one or more vehicles, wherein the information processing apparatus performs operations including: determining, for each of the plurality of areas, whether it is necessary to update the map of that area, the determining being based on at least either an amount of change from the road shape shown by the map to the road shape of a present time or the number of occurrences of a predetermined action of a vehicle having run through that area, the map being stored in a memory of the information processing apparatus; selecting, from among one or more vehicles that are running or planning to run in an area where it has been determined that the map needs to be updated, a detection vehicle that detects the road shape with a high degree of accuracy; and transmitting, via a communication network to the detecting vehicle thus selected, a detection request that causes the detecting vehicle to detect the road shape of the area, and a vehicle selected as the detecting vehicle from among the one or more vehicles performs operations including: receiving the detection request via the communication network from an external information apparatus; determining whether a running mode of the vehicle is switched from a normal mode in which to perform normal running to a detection mode in which to, in order to update the map, perform running that detects the road shape of a road on which the vehicle is running; in a case where it has been determined that switching to the detection mode is made, switching the running mode to the detection mode and controlling the vehicle to run in the detection mode; and in a case where it has been determined that switching to the detection mode is not made, keeping the running mode in the detection mode and controlling the vehicle to run in the normal mode.

It should be noted that general or specific embodiments may be implemented as a system, a method, an integrated circuit, a computer program, a computer-readable storage medium such as a CD-ROM, or any selective combination thereof.

The following describes an information processing apparatus, a vehicle, an information processing method, a running control method, and a map updating method according to an aspect of the present disclosure in detail with reference to the drawings.

It should be noted that each of the embodiments to be described below shows a general or specific example. The numerical values, the shapes, the materials, the constituent elements, the placement positions and connection forms of the constituent elements, the steps, the orders of the steps, and the like that are shown in the following embodiments are mere examples and are not intended to limit the present disclosure. Further, those of the constituent elements in the following embodiments which are not recited in an independent claim representing the most generic concept are described as optional constituent elements. Further, identical elements are assigned the same signs throughout all of the drawings.

Embodiment

The following describes an embodiment with reference to FIGS. 1 to 14B.

1-1. Configuration

FIG. 1 is a schematic view of a map updating system 1 according to the embodiment.

Specifically, FIG. 1 shows an information processing apparatus 100, a plurality of vehicles 200, a communication network 300, and a base station 310 of a mobile communication system. For example, of these constituent elements, the map updating system 1 includes the information processing apparatus 100 and the plurality of vehicles 200. It should be noted that although FIG. 1 shows two vehicles 200, the number of vehicles 200 is not limited, provided it is one or more.

The information processing apparatus 100 is an apparatus that distributes, to the plurality of vehicles 200, a three-dimensional map showing a road on which the plurality of vehicles 200 run and a three-dimensional road shape of an area around the road. The information processing apparatus 100 is for example a server.

Each of the plurality of vehicles 200 includes a three-dimensional road shape shown by the three-dimensional map and a detector (sensor) of that vehicle 200. Each of the plurality of vehicles 200 is for example a vehicle that estimates its own position by performing matching between a road, detected by the detector, on which that vehicle 200 is running and a three-dimensional road shape, detected by the detector, of an area around the road and performs automatic driving or drive assist with use of its own position thus estimated. Each of the plurality of vehicles 200 performs the aforementioned matching, for example, by using an ICP (iterative closest point) algorithm or NDT (normal distributions transform) algorithm.

Incidentally, in the case of a change in shape of the road, a replacement of one building by another in the area around the road, or a substantial change in shape of a natural object such as a tree in the area around the road, the road shape shown by the three-dimensional map no longer agrees with the actual road shape. The shapes of a road and an area around the road change from day to day. For example, the shapes of trees greatly vary according to seasons. Further, in the presence of a building site by a road, the shape of an area around the road changes from day to day. This causes deterioration in matching accuracy.

Such deterioration in matching accuracy leads to deterioration in the accuracy with which the vehicle 200 estimates its own position. The vehicle 200 performs autonomous control of running, stoppage, right and left turns, and the like on the basis of its own position thus estimated. For this reason, if its own position thus estimated greatly deviates from the actual position, the vehicle 200 ends up stopping or turning at a place where it is not supposed to stop or turn. This constitutes a menace to safety. Therefore, in order to secure the safety of running of the vehicle 200 under autonomous control, it is necessary to keep high information freshness of the three-dimensional map retained by the information processing apparatus 100. That is, the frequency of updates needs to be overwhelmingly higher than in the case of an abstract map intended for a conventional car navigation system. Further, it is difficult to achieve detection of road shapes over a wide range with a high frequency of updates by using only a dedicated detecting vehicle that detects road shapes. For this reason, the map updating system 1 causes the plurality of vehicles 200, which are general-purpose vehicles mounted with detectors (sensors), to detect detection data for use in map updating and causes the information processing apparatus 100 to aggregate the detection data.

In a case where the three-dimensional map retained by the information processing apparatus 100 is updated with use of detection data obtained by the sensors of the plurality of vehicles 200, it is not usual to perform updating by using only detection data that one vehicle 200 detected at some point of time. This is because using such detection data in updating in a case where the detection data is low in accuracy for some reason may end up updating the map so that it becomes less accurate. That is, it is advisable to make every effort to avoid performing updating with use of detection data obtained by detecting an incidental change in environment. Therefore, it is only necessary to deem, as solid detection data, a change in environment that is common to plural pieces of detection data obtained by the plurality of vehicles 200 performing detection at dispersed points of time and reflect the detection data in updating. This is a known way of thinking that serves as a basis for Japanese Unexamined Patent Application Publication No. 2016-156973, Japanese Unexamined Patent Application Publication No. 2016-153832, and A. K. Aijazi, P. Checchin, and L. Trassouldaine, "Detecting and Updating Changes in Lidar Point Clouds for Automatic 3D Urban Cartography", ISPRS Ann. Photogramm. Remote Sens. Spatial Inf. Sci., II-5/W2, 7-12, 2013, http://www.isprs-ann-photogramm-remote-sens-spatial-inf-sci.net/II-5-W2/7/2013/isprsannals-II-5-W2-7-2013.pdf.

From this point of view, the information processing apparatus 100 requires plural pieces of detection data even on one change in environment. However, uploading of detection data by all of the vehicles that pass through that point is greatly wasteful both in terms of communications traffic and in terms of computational resources of the information processing apparatus 100. For example, there is a road on which more than 50,000 vehicles run, such as a wide national road with a large amount of traffic. Furthermore, since, as mentioned above, the volume of detection data that is obtained by a LIDAR or a camera is large, communications traffic is enormous.

Conversely, there is a case where updating of the three-dimensional map is unreachable due to insufficient gathering of detection data in an area with a small amount of traffic. Japanese Unexamined Patent Application Publication No. 2016-153832 achieves updating by correcting reliability per piece of data on a road with a small amount of traffic so that it becomes higher. That is, in an area with a small amount of traffic, updating is finalized with a small quantity of detection data, and that way, reliability is sacrificed. To address this problem, it is necessary to detect a larger quantity of detection data in an area with a small amount of traffic and to improve the accuracy of every single piece of detection data.

For this purpose, the information processing apparatus 100 divides the three-dimensional map into a plurality of areas, determines, for each of the plurality of areas, whether it is necessary to update the three-dimensional map, and requests one or more vehicles 200 to detect detection data only in an area where the three-dimensional map needs to be updated. Further, the information processing apparatus 100 selects a vehicle 200 that is capable of detecting a road shape with a high degree of accuracy as a vehicle 200 that the information processing apparatus 100 requests to detect detection data from among one or more vehicles 200 that are running or planning to run in the area. In this way, the information processing apparatus 100 selects, for an area where updating is needed, a vehicle 200 that is capable of detecting a road shape with a high degree of accuracy and transmits a detection request to the vehicle 200. This makes it possible to keep the information freshness of the three-dimensional map as high as possible and reduce communications traffic that is generated for aggregation of detection data and the processing load of the detection data.

A hardware configuration of the information processing apparatus 100 is described with reference to FIG. 2.

Figure 2:
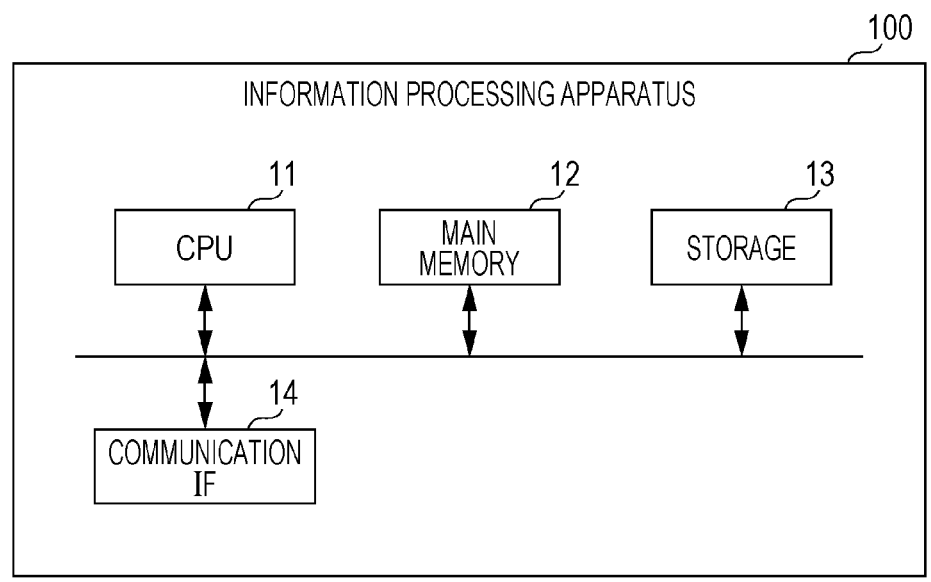
FIG. 2 is a block diagram showing an example of a hardware configuration of an information processing apparatus according to the embodiment.

FIG. 2 is a block diagram showing an example of the hardware configuration of the information processing apparatus 100 according to the embodiment.

As shown in FIG. 2, the information processing apparatus 100 includes a CPU (central processing unit) 11, a main memory 12, a storage 13, and a communication IF (interface) 14 as hardware components.

The CPU 11 is a processor that executes a control program stored in the storage 13 or the like.

The main memory 12 is a volatile storage area that is used as a work area that is used when the CPU 11 executes the control program.

The storage 13 is a nonvolatile storage area that retains the control program, contents, and the like.

The communication IF 14 is a communication interface that communicates with the plurality of vehicles 200 via a communication network. The communication IF 14 is for example a cable LAN interface. Alternatively, the communication IF 14 may be a wireless LAN interface. Further, without being limited to a LAN interface, the communication IF 14 may be any communication interface that can establish a communication connection with the communication network.

Next, a hardware configuration of a vehicle 200 is described with reference to FIG. 3.

Figure 3:
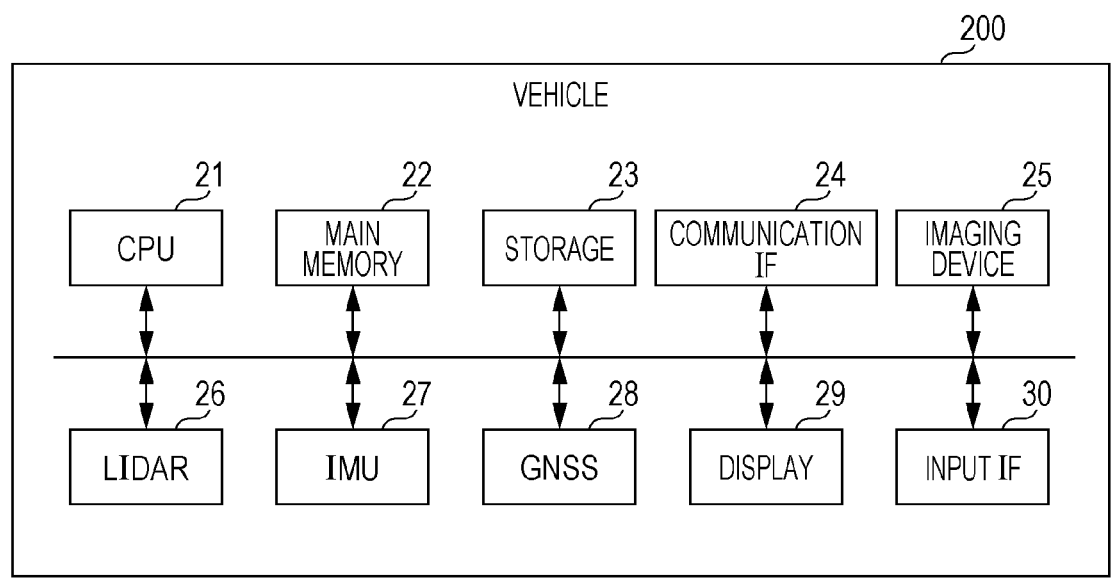
FIG. 3 is a block diagram showing an example of a hardware configuration of a vehicle according to the embodiment.

FIG. 3 is a block diagram showing an example of the hardware configuration of the vehicle 200 according to the embodiment.

As shown in FIG. 3, the vehicle 200 includes a CPU (central processing unit) 21, a main memory 22, a storage 23, a communication IF (interface) 24, an imaging device 25, a LIDAR 26, an IMU 27, a GNSS 28, a display 29, and an input IF (interface) 30 as hardware components. It should be noted that FIG. 3 shows a configuration of each of the plurality of vehicles 200. It should be noted that it is not necessary for each of the plurality of vehicles 200 to include all of the hardware components shown in FIG. 3. For example, the vehicle 200 needs only include at least either the imaging device 25 or the LIDAR 26. Further, the vehicle 200 does not need to include the display 29. Further, the vehicle 200 does not need to include the input IF 30. Further, the vehicle 200 may include a dedicated circuit instead of the CPU (central processing unit) 21 and the main memory 22.

The CPU 21 is a processor that executes a control program stored in the storage 23 or the like.

The main memory 22 is a volatile storage area that is used as a work area that is used when the CPU 21 executes the control program.

The storage 23 is a nonvolatile storage area that retains the control program, contents, and the like.

The communication IF 24 is a communication interface that communicates with the information processing apparatus 10 via the communication network 300. That is, the communication IF 24 needs only be a communication interface that is capable of making a communication connection to the communication network 300. Specifically, the communication IF 24 is a communication interface that makes a communication connection to the communication network 300 through a communication connection to the base station 310 of the mobile communication system. The communication IF 24 may for example be a radio communication interface that complies with a communication standard that is used in a mobile communication system such as a thirdgeneration (3G) mobile communication system, a fourth-generation (4G) mobile communication system, or LTE (registered trademark). Another example of the communication IF 24 may be a wireless LAN (local area network) interface that complies with the IEEE802.11a, b, g, or n standard or a communication interface that makes a communication connection to the communication network 300 through a communication connection to a router (e.g. a mobile wireless LAN router; not illustrated).

The imaging device 25 is a camera including an optical system such as a lens and an image sensor.

The LIDAR 26 is a laser sensor that detects a distance to an object located within a range of detection in an angular range of 360 degrees all around in a horizontal direction of the vehicle 200 and a predetermined angle (e.g. 30 degrees) in a vertical direction of the vehicle 200. The LIDAR 26 measures the distance from the LIDAR 26 to an object by emitting a laser toward its surroundings and sensing a laser reflected by a surrounding object. For example, the LIDAR 26 measures the distance in the order of centimeters. In this way, the LIDAR 26 detects the three-dimensional coordinates of each of a plurality of points on a terrain surface of an area around the vehicle 200. That is, the LIDAR 26 can detect the three-dimensional shape of a terrain including an object around the vehicle 200 by detecting a plurality of three-dimensional coordinates of the surrounding terrain surface.

The IMU 27 is a sensor device that includes an acceleration sensor and a gyro sensor. The acceleration sensor is a sensor that detects accelerations applied in three different directions of the vehicle 200, respectively. The gyro sensor is a sensor that detects the angular velocity of each of three axial rotations about the three different directions of the vehicle 200, respectively.

The GNSS 28 receives information indicating the position of the GNSS 28 from an artificial satellite including a GPS satellite. That is, the GNSS 28 detects the present position of the vehicle 200.

The display 29 is a display device that displays a result of processing in the CPU 21. The display 29 is for example a liquid crystal display or an organic EL display. The display 29 is disposed in a vehicle interior of the vehicle 200.

The input IF 30 is for example a touch panel, disposed on a surface of the display 29, that receives an input from a user to a UI (user interface) that is displayed on the display 29. The input IF 30 may for example by an input device such as a numeric keypad, a keyboard, or a mouse. The input IF 30 is disposed in the vehicle interior of the vehicle 200.

With continued reference to FIG. 1, the communication network 300 is a communication network through which the information processing apparatus 100 and the plurality of vehicles 200 communicate with each other. The communication network 300 may be a general-purpose network such as the Internet or may be a network dedicated to the map updating system 1.

Next, a functional configuration of the map updating system 1 is described with reference to FIG. 4.

Figure 4:
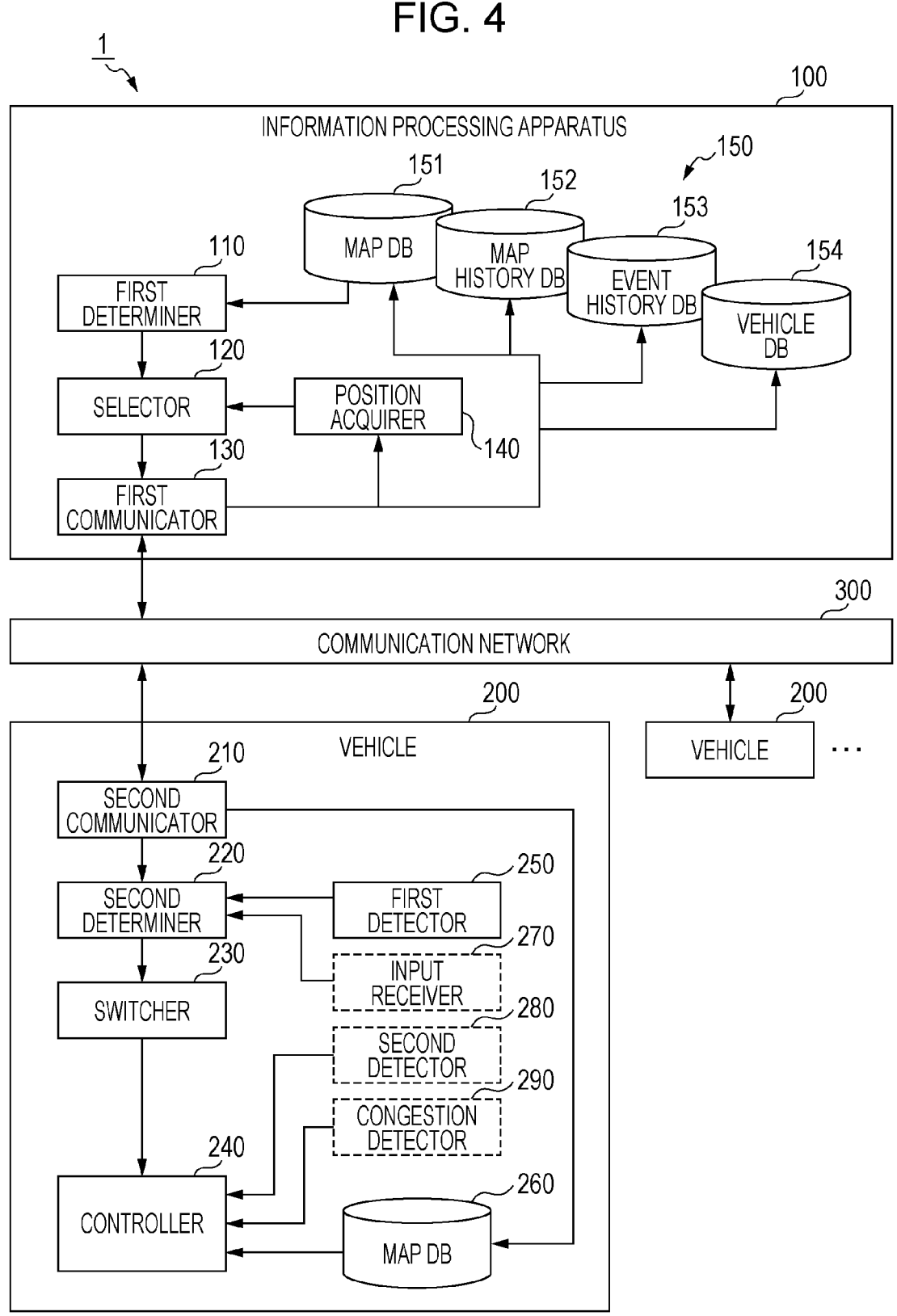
FIG. 4 is a block diagram showing an example of a functional configuration of the map updating system according to the embodiment.

FIG. 4 is a block diagram showing an example of the functional configuration of the map updating system 1 according to the embodiment.

First, the functional configuration of the information processing apparatus 100 is described.

The information processing apparatus 100 includes a first determiner 110, a selector 120, a first communicator 130, and a database 150 as functional components. The information processing apparatus 100 may further include a position acquirer 140.

For each of the plurality of areas, the first determiner 110 determines, on the basis of at least either an amount of change from the road shape shown by the three-dimensional map to the present road shape of the road or the number of occurrences of a predetermined action of a vehicle 200 having run through that area, whether it is necessary to update the three-dimensional map of that area. Specifically, the first determiner 110 computes a score for each of the plurality of areas on the basis of at least either the amount of change or the number of occurrences. Moreover, the first determiner 110 may determine that it is necessary to update the three-dimensional map of that one of the plurality of areas where the score thus computed exceeds a predetermined score.

For example, the first determiner 110 may use Formula 1 below to compute a score for determining whether it is necessary to update the map.

$$S = \alpha \frac{\sum_i c_i}{P} T + \sum_j \beta_j p_j \quad (1)$$

Figure 5:
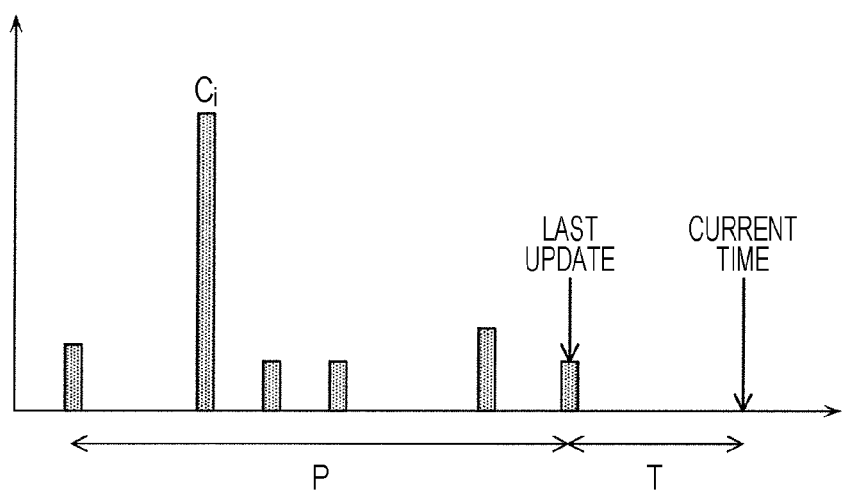
FIG. 5 is a graph for explaining the computation of a score by a first determiner.

FIG. 5 is a graph for explaining the computation of a score by the first determiner 110.

Note here that, in Formula 1 and FIG. 5, S denotes the score, $c_i$ denotes the amount of change in past update score, P denotes a predetermined period of time preceding the last update time, T denotes the time elapsed since the last update time up to the current time, $p_j$ denotes the number of occurrences of various events, and $\alpha$ and $\beta_j$ denote coefficients. The number of occurrences of various events is the number of occurrences of predetermined actions of a vehicle 200. Further, the predetermined actions are sudden deceleration, sudden acceleration, manual driving interruption during automatic driving, and quick avoidance that have occurred in the vehicle 200 during the predetermined period of time T up to the present time. The predetermined actions do not need to be all of sudden deceleration, sudden acceleration, manual driving interruption, and quick avoidance, but needs only be at least one of them.

The score that the first determiner 110 computes is a weighted sum of a score indicated by the first term of Formula 1 and based on an amount of change from the road shape shown by the three-dimensional map to the present road shape of the road and a score indicated by the second term of Formula 1 and based on the number of occurrences of a predetermined action of a vehicle 20 having run through an area. That is, an area where updating frequently takes place in the past update history, an area where the time elapsed since the last update time is long, or an area where an event such as sudden deceleration or quick avoidance frequency takes place tends to be high in score. The score may be either the score indicated by the first term of Formula 1 or the score indicated by the second term of Formula 1.

Figure 6:
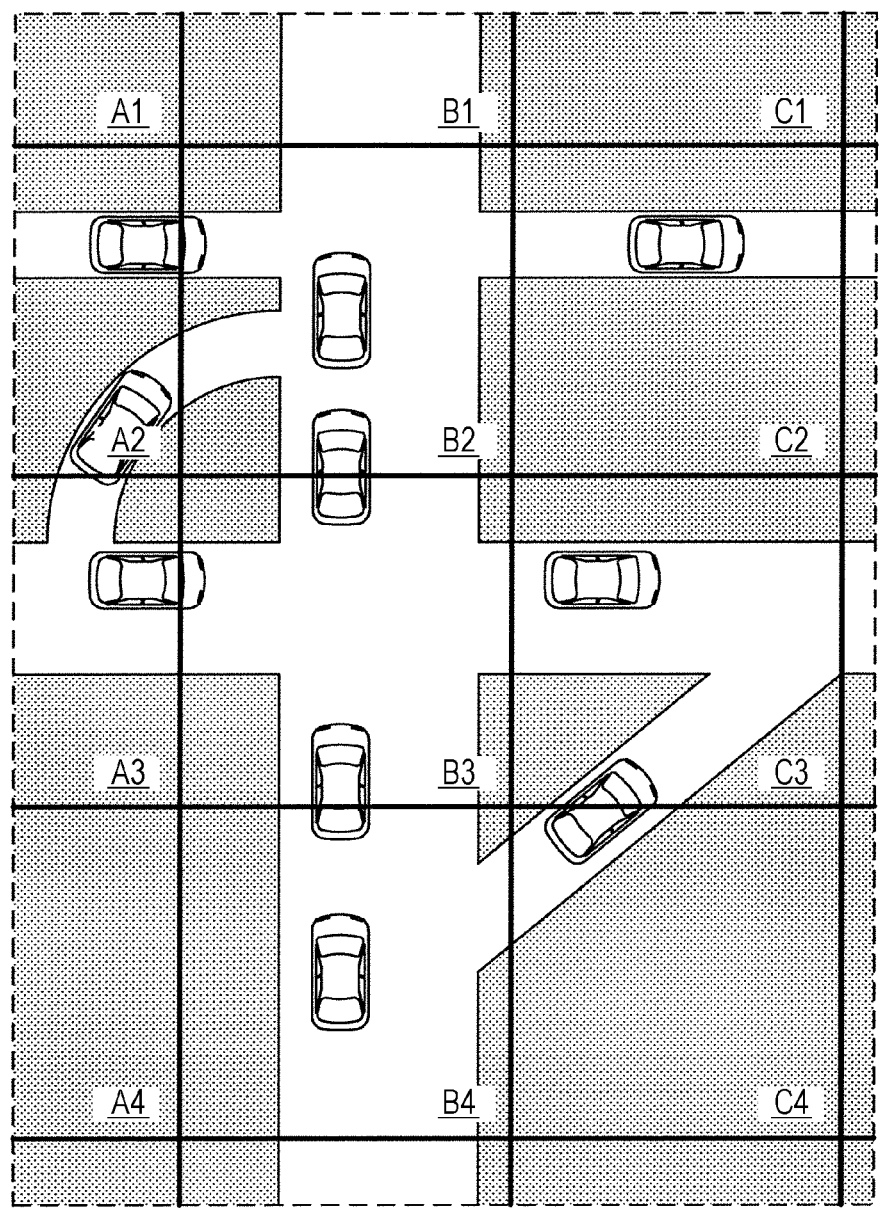
FIG. 6 is a diagram showing a part of a three-dimensional map divided into a plurality of areas.

FIG. 6 is a diagram showing a part of a three-dimensional map divided into a plurality of areas.

As shown in FIG. 6, the first determiner 110 computes a score by performing a calculation according to Formula 1 for each of the plurality of areas A1 to A4, B1 to B4, and C1 to C4. Since the plurality of areas that constitute the three-dimensional map shown in FIG. 6 are partial, the first determiner 110 also performs a calculation according to Formula 1 for each of a plurality of areas that are not shown in FIG. 6.

Further, the first determiner 110 may increase a predetermined score of that one of the plurality of areas where the number of times it has been determined per unit period that updating is needed is not smaller than a first number of times and decrease a predetermined score of that one of the plurality of areas where the number of times it has been determined per unit period that updating is needed is smaller than a second number of times that is not larger than the first number of times.

The first determiner 110 is realized, for example, by the CPU 11, the main memory 12, the storage 13, and the like.

The selector 120 selects, from among one or more vehicles 200 that are running or planning to run in an area where it has been determined by the first determiner 110 that the three-dimensional map needs to be updated, a detection vehicle that detects the road shape. With use of the present positions or running routes of a plurality of vehicles 200 as acquired by the after-mentioned position acquirer 140, the selector 120 may identify the one or more vehicles 200 that are running or planning to run in the area.

Furthermore, with use of vehicle information stored in the after-mentioned vehicle database 154, the selector 120 may select, from among the one or more vehicles 200 thus identified that are running or planning to run in the area, a detecting vehicle that detects the road shape. For example, with use of vehicle height information or model information included in the vehicle information, the selector 120 may select, as the detecting vehicle, a vehicle whose vehicle height is not lower than a predetermined height. Further, for example, with use of sensor information or model information included in the vehicle information, the selector 120 may select, as the detecting vehicle, a vehicle having a sensor that detects the road shape and whose detection accuracy is not lower than a predetermined degree of accuracy. Further, for example, with use of history information included in the vehicle information, the selector 120 may select, as the detecting vehicle, a vehicle that has ever run in a detection mode in which to detect the road shape in order to update the three-dimensional map.

The selector 120 is realized, for example, by the CPU 11, the main memory 12, the storage 13, and the like.

The first communicator 130 transmits, via the communication network 300 to the detecting vehicle selected by the selector 120, a detection request that causes the detecting vehicle to detect the road shape of the area. The first communicator 130 is an example of a first communicator. The first communicator 130 may receive, via the communication network 300 from a vehicle 200 to which it has transmitted the detection request as the detecting vehicle, detection data detected by a sensor of the vehicle 200. Further, the first communicator 130 may receive position information indicating the present position of each of the plurality of vehicles 200 or route information indicating the running route of each of the plurality of vehicles 200. Further, the first communicator 130 may receive a history of occurrences of a predetermined action of each of the plurality of vehicles 200. A history of occurrences of a predetermined action received by the first communicator 130 is stored in an event history database 153 for each of the plurality of vehicle 200. The first communicator 130 is realized, for example, by the CPU 11, the main memory 12, the storage 13, the communication IF 14, and the like.

The position acquirer 140 acquires the present positions or running routes of the plurality of vehicles 200 via the first communicator 130. The position acquirer 140 acquires the present positions or running routes of the plurality of vehicles 200 every few seconds to several tens of seconds.

The position determiner 140 is realized, for example, by the CPU 11, the main memory 12, the storage 13, and the like.

The database 150 includes a map database 151, a map history database 152, the event history database 153, and the vehicle database 154.

The map database 151 stores a three-dimensional map divided into a plurality of areas. The plurality of areas are a plurality of areas into which an area of a two-dimensional map has been divided. The three-dimensional map is a point cloud map, and is data in which a terrain (shape of land) including a road is constituted by a point cloud on a three-dimensional space. The point cloud is constituted by a plurality of points (e.g. millions of points or more) each represented by three-dimensional coordinates (x, y, z).

When the first communicator 130 receives, from a detecting vehicle, detection data detected by a sensor of the detecting vehicle, the three-dimensional map of the map database 151 is updated to be a three-dimensional map based on the detection data thus received. For this reason, the map database 151 stores the most recent three-dimensional map. The three-dimensional map stored in the map database 151 that is yet to be updated is based on data on a road shape detected in advance with use of an apparatus including a predetermined sensor.

The map history database 152 stores a three-dimensional map that was stored in the map database 151 in the past. That is, the map history database 152 stores a three-dimensional map that was stored in the map database 151 and that has been brought out of date by being updated. The map history database 152 may be included in the map database 151.

The event history database 153 stores, for each of the plurality of vehicles 200, a history of occurrences of a predetermined action of that vehicle 200 as acquired via the first communicator 130. For example, as shown in FIG. 7A, the event history database 153 holds data of association between vehicle IDs that identify the plurality of vehicles 200, predetermined actions having occurred, times of occurrence of the predetermined actions, and areas of occurrence of the predetermined actions.

The vehicle database 154 stores vehicle information. The vehicle information is information regarding the plurality of vehicles 200. Specifically, the vehicle information may also include vehicle height information indicating the vehicle height of each of the plurality of vehicles 200. Further, the vehicle information may also include sensor information indicating the detection accuracy of a sensor of each of the plurality of vehicles 200. Further, the vehicle information may also include model information indicating models. The model information may for example include the vehicle height information. Further, the model information may also be used to identify the detection accuracy of a sensor. That is, since a model can be identified by using the model information, the type of a sensor of a vehicle of the model can be identified. Accordingly, the detection accuracy of the sensor can be identified by using the model information. Further, the vehicle information may also include history information indicating, for each of the plurality of vehicles 200, whether that vehicle 200 ran in the detection mode in which to detect the road shape. For example, as shown in FIG. 7B, the vehicle database 154 holds data of association between vehicle IDs that identify the plurality of vehicles 200, the vehicle heights of the vehicles 200, the sensor accuracy of sensors of the vehicles 200, the numbers of times the vehicles 200 ran in the detection mode, which serves as history information.

It should be noted that although FIG. 7B has, as vehicle heights, information categorized into three levels "high", "medium", and "low" according to vehicle heights, it may alternatively have the numerical values of vehicle heights per se.

Further, the sensor accuracy in FIG. 7B may be defined by being categorized into "high", "medium", "low", "unknown", and the like by performing a predetermined detection test in advance for each of the plural types of sensor. The type of a sensor and a vehicle may be associated according to the model, or the type of a sensor of a vehicle may be identified by acquiring information indicating the type of the sensor from the vehicle. It should be noted that "unknown" represents a sensor that has not been subjected to the predetermined test.

The database 150 is realized, for example, by the storage 13 and the like. It should be noted that the map database 151, map history database 152, event history database 153, and vehicle database 154 of the database 150 may be realized by one storage, may be realized by a plurality of storages, or may be realized by a plurality of respectively corresponding storages. Further, the information processing apparatus 100 does not need to include the database 150, and a second apparatus that is separate from the information processing apparatus 100 may include the database 150. In this case, the information processing apparatus 100 and the second apparatus are communicably connected to each other.

Next, a functional configuration of a vehicle 200 is described.

The vehicle 200 includes a second communicator 210, a second determiner 202, a switcher 230, a controller 240, a first detector 250, and a map database 260 as functional components. The vehicle 200 may further include an input receiver 270. The vehicle 200 may further include a second detector 280. The vehicle 200 may further include a congestion detector 290.

The second communicator 210 receives, via the communicator network 300 from the external information processing apparatus 100, a detection request to detect the current road shape. The second communicator 210 is an example of a second communicator. The second communicator 210 may also transmit, via the communication network 300 to the information processing apparatus 100, detection data indicating a road shape as detected by the first detector 250. Further, the second communicator 210 may also transmit, via the communication network 300 to the information processing apparatus 100, position information indicating the present position or route information indicating the running route. Further, the second communicator may also transmit a history of occurrences of a predetermined action of the vehicle 200 to the information processing apparatus 100 via the communication network 300. The second communicator 210 is realized, for example, by the CPU 21, the main memory 22, the storage 23, the communication IF 24, and the like.

In a case where a detection request has been received by the second communicator 210, the second determiner 220 determines whether a running mode of the vehicle 200 is switched from a normal mode to the detection mode. The normal mode is a running mode in which to perform normal running. The detection mode is a running mode in which to perform running that detects a three-dimensional road shape of a road on which the vehicle 200 is running. More specifically, the detection mode is a running mode in which to run in a state of change in at least one of the settings of making the maximum speed lower, making the maximum acceleration lower, making the intervehicular distance between the vehicle 200 and another vehicle larger, or making the first detector 250 perform detection at a higher detection frequency than in the normal mode. In the detection mode, the maximum speed, maximum acceleration, intervehicular distance, and detection frequency to be set may take on predetermined fixed values or may be changed according to scores to values that are computed according to Formula 2 below. Control after change in setting may involve the use of a technology similar to a cruise control function or the like that is already in practical use. It should be noted that the detection frequency of the first detector 250 is a sampling frequency at which the first detector 250 performs detection. For example, the detection frequency of the first detector 250 is a sampling frequency at which the first detector 250 detects positions in one direction. In the case of the LIDAR 26, the detection frequency is a rotational frequency.

$$v_{new} = \max\left(v_{old}\frac{S_{th}}{S}, v_{min}\right) \quad (2)$$

$v_{new}$: Maximum speed of detection mode
$v_{old}$: Maximum speed of normal mode (such as speed limit)
$S_{th}$: Threshold score
$S$: Current score
$v_{min}$: Minimum speed In a case where an input received by the after-mentioned input receiver 270 indicates approval to switch the running mode from the normal mode to the detection mode, i.e. approval, the second determiner 220 may determine that the running mode is switched. On the other hand, in a case where an input received by the input receiver 270 indicates disapproval to switch the running mode from the normal mode to the detection mode, i.e. disapproval, the second determiner 220 may determine that the running mode is not switched.

Further, in a case where the vehicle 200 is a vehicle that carries a passenger, and in a case where the vehicle 200 is not on its way to pick up the passenger and the vehicle 200 is not carrying the passenger, the second determiner 220 may determine that the running mode is switched. On the other hand, in a case where the vehicle 200 is on its way to pick up the passenger or the vehicle 200 is carrying the passenger, the second determiner 220 may determine that the running mode is not switched. It should be noted that the clause "the vehicle 200 is on its way to pick up the passenger" indicates a state where the vehicle 200 is running to a place where the passenger is in order to carry the passenger. Further, the clause "the vehicle 200 is carrying the passenger" indicates a state where the vehicle 200 is running with the passenger on board the vehicle 200.

The second determiner 220 is realized, for example, by the CPU 21, the main memory 22, the storage 23, and the like.

In a case where the second determiner 220 has determined that switching to the detection mode is made, the switcher 230 switches the running mode to the detection mode, and in a case where the second determiner 220 has determined that switching to the detection is not made, the switcher 230 keeps the running mode in the normal mode.

The controller 240 causes the vehicle 200 to run in a running mode to which the switcher 230 has made switching. In a case where the switcher 230 has switched the running mode to the detection mode, the controller 240 may cause the vehicle 200 to run in the normal mode when the after-mentioned second detector 280 is detecting a following vehicle. Further, in a case where the switcher 230 has switched the running mode to the detection mode, the controller 240 may cause the vehicle 200 to run in the normal mode when the after-mentioned congestion detector 290 is detecting an occurrence of congestion in an area around the vehicle 200. That is, even in a case where switching to the detection mode has been made, the controller 240 may cause the vehicle 200 to stop running in the detection mode and start to run in the normal mode in a case where a following vehicle has been detected or in a case where congestion has been detected.

The first detector 250 detects a three-dimensional road shape of a road. In a case where the switcher 230 has switched the running mode to the detection mode, the first detector 250 detects a three-dimensional road shape of a road on which the vehicle 200 is running, with the vehicle 200 running in the detection mode. The first detector 250 is realized, for example, by the CPU 21, the main memory 22, the storage 23, the imaging device 25, the LIDAR 26, and the like.

The map database 260 stores a three-dimensional map. The most recent three-dimensional map stored in the map database 151 of the information processing apparatus 100 is acquired through the second communicator 210 every predetermined period of time, and the most recent three-dimensional map acquired through the second communicator 210 is stored in the map database 260. The map database 260 is realized, for example, by the CPU 21, the main memory 22, the storage 23, and the like.

Figure 8A:
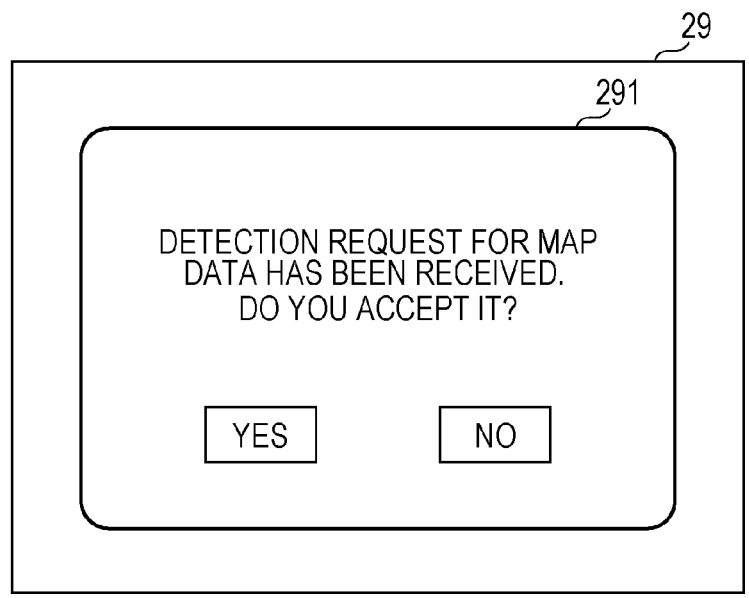
FIG. 8A is a diagram showing an example of a UI that notifies the reception of a detection request.
Figure 8B:
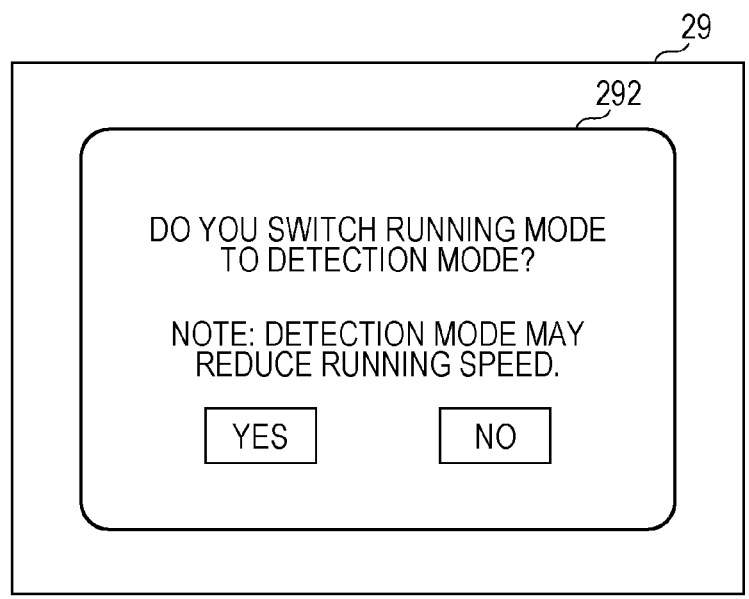
FIG. 8B is a diagram showing an example of a UI that asks a user whether to switch a running mode to a detection mode.

The input receiver 270 receives an input indicating whether to give approval to switch the running mode from the normal mode to the detection mode. For example, the input receiver 270 receives the input from a person who is in the vehicle interior of the vehicle 200. For example, the input receiver 270 is realized, for example, by the display 29 and the input IF 30 and, as shown in FIG. 8A or 8B, displays, on the display 29, a UI 291 that notifies reception of a detection request or a UI 292 that asks the user whether to switch the running mode to the detection mode. The user can operate the input IF 30 to select "YES" or "NO" being displayed on the UI 291 or the UI 292. The input receiver 270 receives, as the input indicating whether to give approval to switch the running mode from the normal mode to the detection mode, the input indicating "YES" or "NO" received through the UI 291 or the UI 292. The input receiver 270 receives, as an input indicating approval to switch to the detection mode, an input indicating "YES" received through the UI 291 or the UI 292, and receives, as input indicating disapproval to switch to the detection mode, an input indicating "NO" received through the UI 291 or the UI 292.

The second detector 280 detects a following vehicle falling within a certain distance from the vehicle 200. The second detector 280 is realized, for example, by the CPU 21, the main memory 22, the storage 23, the imaging device 25, the LIDAR 26, and the like. It should be noted that in a case where the imaging device 25 fulfills a part of the function of the second detector 280, the imaging device 25 takes an image of an area behind the vehicle 200.

The congestion detector 290 detects an occurrence of congestion in an area around the vehicle 200. The congestion detector 290 may detect an occurrence of congestion by estimating whether the density of a plurality of other vehicles 200 in an area around the vehicle 200 is not lower than a predetermined density. Specifically, the congestion detector 290 may estimate the density by estimating how many other vehicles 200 there are in a predetermined range around the vehicle 200. The congestion detector 290 is realized, for example, by the CPU 21, the main memory 22, the storage 23, the imaging device 25, the LIDAR 26, and the like. The congestion detector 290 may detect an occurrence of congestion in an area around the vehicle 200 by, on the basis of the present position of the vehicle 200, acquiring information on congestion in an area around the present position from the external information processing apparatus 100.

1-2. Operation

Next, an operation of the map updating system 1 is described.

Figure 9:
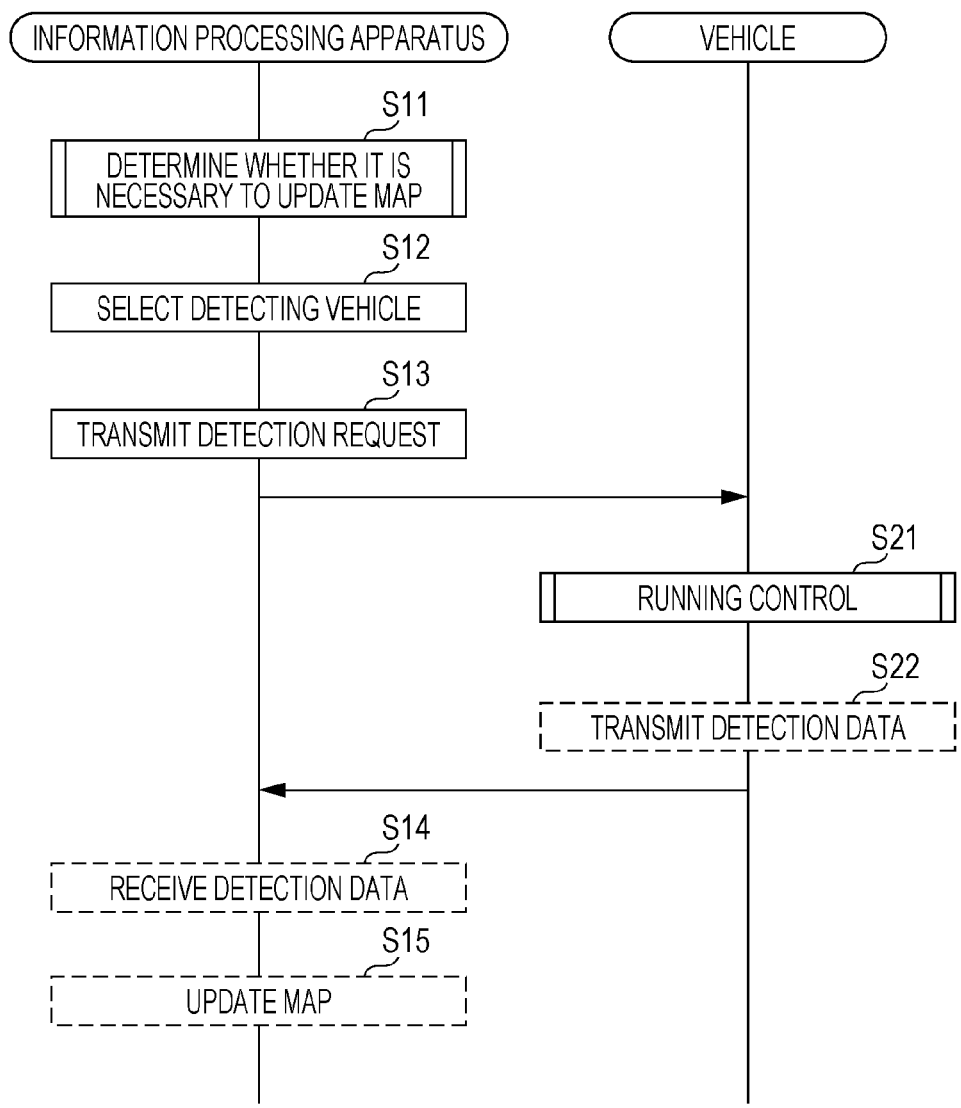
FIG. 9 is a sequence chart showing an example of a map updating method by the map updating system according to the embodiment.

FIG. 9 is a sequence chart showing an example of a map updating method by the map updating system 1 according to the embodiment.

The map updating method includes an information processing method that is executed by the information processing apparatus 100 and a running control method that is executed by a vehicle 200.

First, in the information processing apparatus 100, the first determiner 110 determines, for each of the plurality of areas, whether it is necessary to update the map of that area (S11). An update determination process of determining whether it is necessary to update the map will be described in detail later.

The selector 120 selects, from among one or more vehicles 200 that are running or planning to run in an area where it has been determined by the first determiner 110 that the map is needs to be updated, a detection vehicle that detects the road shape (S12).

The first communicator 130 transmits, via the communication network 300 to the detecting vehicle, a detection request that causes the detecting vehicle to detect the road shape of the area (S13).

Then, the vehicle 200 selected as the detecting vehicle starts running control by receiving the detection request (S21). Under running control, the vehicle 200 runs in the detection mode, when permitted to run in the detection mode, and detects the road shape. The running control including the reception of the detection request will be described in detail later.

In a case of having detected the road shape, the vehicle 200 transmits detection data obtained to the information processing apparatus 100 via the communication network 300 (S22).

Then, in the information processing apparatus 100, the first communicator 130 receives the detection data transmitted from the vehicle 200 (S14), and updating of the three-dimensional map of the map database 151 is performed (S15).

It should be noted that it is not always necessary to execute steps S22, S14, and S15. For example, the information processing apparatus 100 does not need to include the map database 151 but may have its configuration separated into a first information processing apparatus including the first determiner 110, the selector 120, and the first communicator 130 and a second information processing apparatus including the database 150. In this case, the first information processing apparatus acquires, from the second information processing apparatus, information for determining whether it is necessary to update the map and executes steps S11 to S13. The vehicle 200 executes step S21 and executes, instead of step S22, a step of transmitting the detection data to the second information processing apparatus. Then, the second information processing apparatus executes steps S14 and S15.

Figure 10:
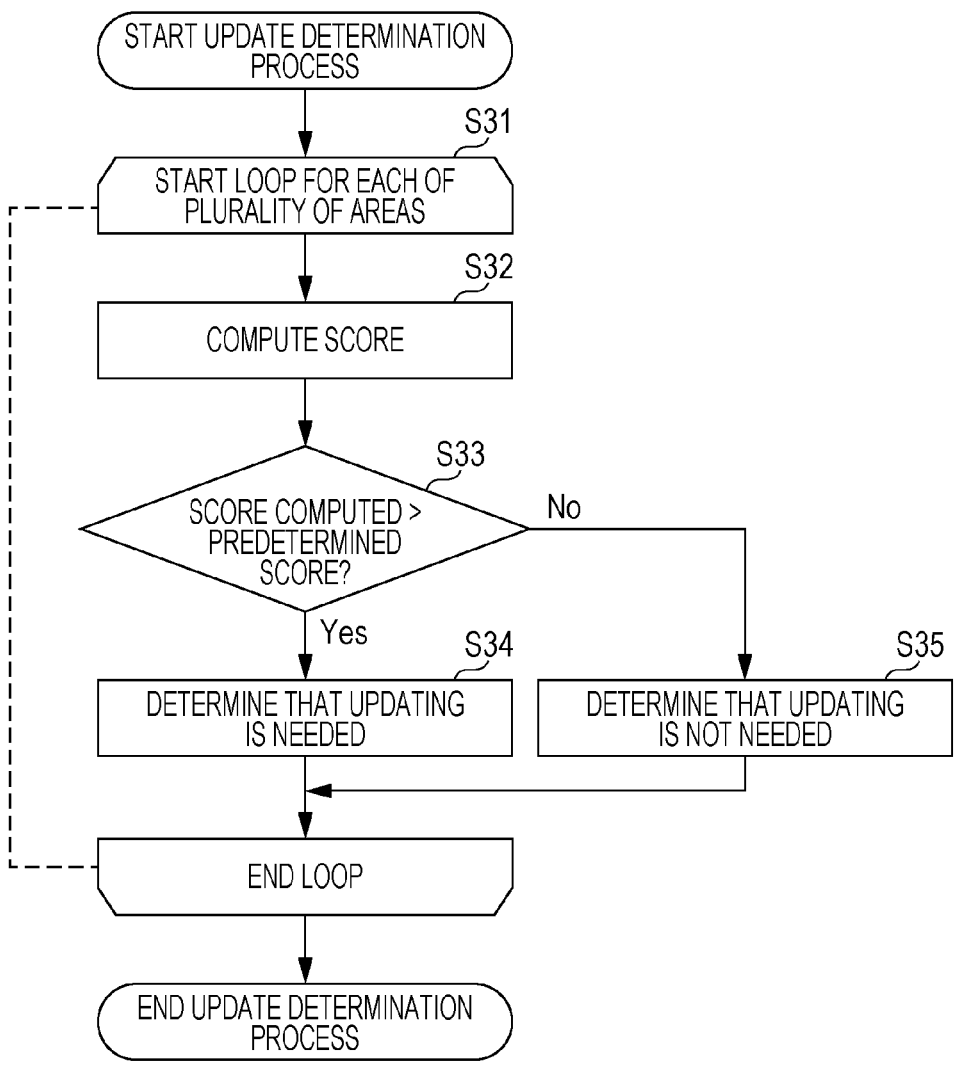
FIG. 10 is a flow chart showing a detailed example of an update determination process according to the embodiment.

FIG. 10 is a flow chart showing a detailed example of an update determination process according to the embodiment.

The information processing apparatus 100 repeatedly performs the update determination process every predetermined period of time.

The first determiner 110 performs a loop of executing the following steps S32 to S35 for each of the plurality of areas A1 to A4, B1 to B4, and C1 to C4 (S31).

The first determiner 110 computes a score of one of the plurality of areas, e.g. the area A1 (S32). The first determiner 110 computes the score, for example, according to Formula 1.

The first determiner 110 determines whether the score thus computed exceeds a predetermined score (S33).

In a case of having determined that the score thus computed exceeds the predetermined score (Yes in S33), the first determiner 110 determines that the area A1 is needs updating (S34).

On the other hand, in a case of having determined the score thus computed is not higher than the predetermined score (No in S33), the first determiner 110 determines that the area A1 does not need updating (S35).

Once step S34 or S35 is executed for the area A1, the first determiner 110 repeats the loop in sequence for each of the remaining areas A2 to A4, B1 to B4, and C1 to C4, for which the loop has not been performed yet. In a case where the loop has been performed for all of the areas A1 to A4, B1 to B4, and C1 to C4, the first determiner 110 ends the loop and end the update determination process.

It should be noted that although the foregoing assumes that the first determiner 110 performs the update determination process for each of the plurality of areas A1 to A4, B1 to B4, and C1 to C4 by executing the loop, the first determiner 110 may alternatively perform the update determination process by executing steps S32 to S35 in parallel for each of the plurality of areas A1 to A4, B1 to B4, and C1 to C4.

FIG. 11 is a flow chart showing a detailed example of running control according to the embodiment.

A vehicle 200 to which a detection request has been transmitted by the information processing apparatus 100, i.e. a vehicle 200 selected as a detecting vehicle by the information processing apparatus 100, performs running control.

In the vehicle 200, the second communicator 210 receives the detection request (S41).

The second determiner 220 determines whether the running mode of the vehicle 200 is switched from the normal mode to the detection mode (S42).

In a case where the second determiner 220 has determined that the running mode is switched to the detection mode (Yes in S42), the switcher 230 makes switching to the detection mode (S43). In a case where the second determiner 220 has determined that the running mode is not switched to the detection mode (No in S42), the switcher 230 keeps the running mode in the normal mode and ends the running control process.

The controller 240 causes the vehicle 200 to run in the detection mode, to which switching has been made by the switcher 230, in an area where it has been determined that updating is needed (S44), and causes the first detector 250 to detect a road shape in the area. At this point in time, the controller 240 causes the vehicle 200 to run in a state of change in at least one of the settings of making the maximum speed lower, making the maximum acceleration lower, making the intervehicular distance between the vehicle 200 and another vehicle larger, or making the first detector 250 perform detection at a higher detection frequency than in the normal mode, and causes the first detector 250 to detect a road shape in this state.

The switcher 230 determines whether detection of a road shape in the area has ended (S45).

In a case of having determined that detection has ended (Yes in S45), the switcher 230 switches the running mode of the vehicle 200 from the detection mode to the normal mode (S46). On the other hand, in a case of having determined that detection has not ended (No in S45), the switcher 230 repeats step S45. That is, the switcher 230 continues the detection mode until the end of detection of a road shape in the area and, once the detection ends, switches from the detection mode to the normal mode.

The controller 240 causes the vehicle 200 to run in the normal mode, to which switching has been made by the switcher 230 (S47), and ends the running control.

It should be noted that it is not always necessary to execute steps S45 to S47.

1-3. Example of Running in Detection Mode

FIG. 12 is a diagram for explaining an effect that is brought about by running at a larger intervehicular distance in the detection mode.

As shown in FIG. 12, the LIDAR 26 is disposed as a sensor on top of the vehicle 200. The plurality of dashed lines indicate a laser that is emitted from the LIDAR 26, and the LIDAR 26 emits a laser in a range from the dashed line 40 to the dashed line 41.

Assume that a truck 400 is running ahead of the vehicle 200. At this point in time, detection data detected by the LIDAR 26 is preferably data obtained by detecting an object described on a map, such as a surrounding building, tree, or road, but not data obtained by detecting the truck 400 temporarily running ahead. However, since the LIDAR 26 cannot see through, it is difficult to detect an object that is on an opposite side of the truck 400.

In this case, the LIDAR 26 detects the truck 400, which is an object that should not be detected, and cannot detect an object that should be detected. This raises the possibility of misrecognizing the truck 400 as a change in environment on the basis of the detection data thus detected. It is of course possible to detect the truck 400 from an image or the like obtained by the imaging device 25 in parallel to the LIDAR 26 and exclude updating the map with use of the detection data obtained by detecting the truck 400. However, it is impossible to avoid being incapable of detecting an object that should be detected, as the process for detecting the truck 400 imposes a load. Therefore, it is effective to keep a large intervehicular distance from a vehicle ahead in order to effectively detect an object that should be detected, as in such a case as that shown in FIG. 12 where the truck 400 is running ahead.

It should be noted that although an example has been described where an object is detected with the LIDAR 26, the same applies to a case where an object is detected with use of an imaging device such as a stereo camera.

It should be noted that it is considered to be necessary to make consideration not to change the intervehicular distance settings in a case of detecting a following vehicle on a single-lane road or during congestion. Since congestion information can be acquired by stock cars and lane information is usually included in map information, a following vehicle can be easily sensed by an all-round LiDAR or a rearview camera.

Figure 13A:
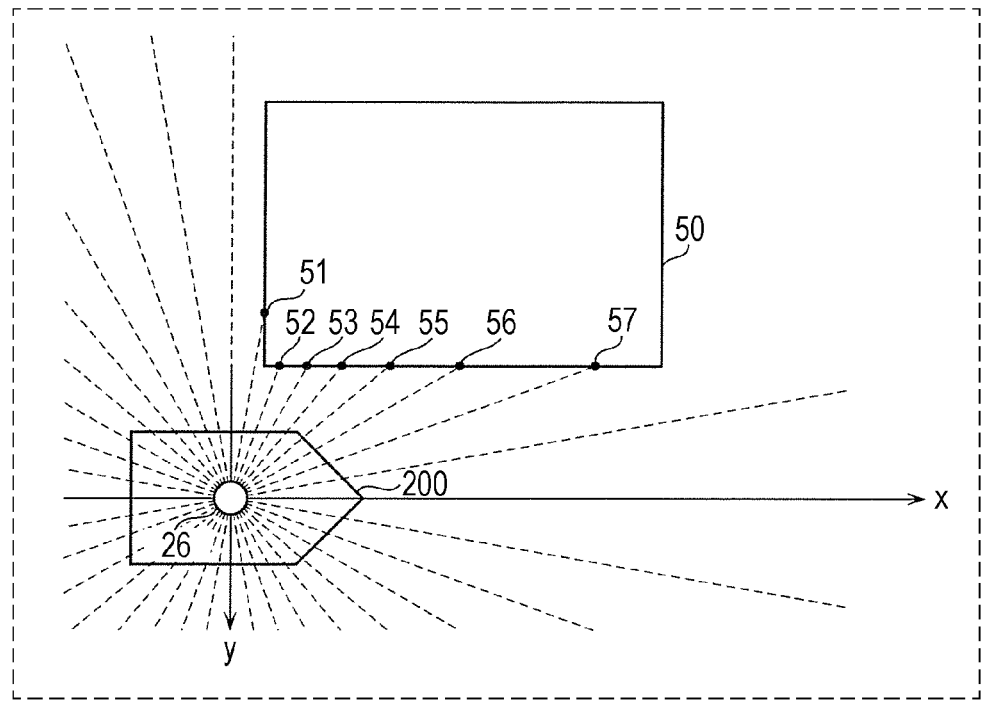
FIG. 13A is a diagram for explaining an effect that is brought about by running at a lower maximum speed or maximum acceleration in the detection mode.
Figure 13B:
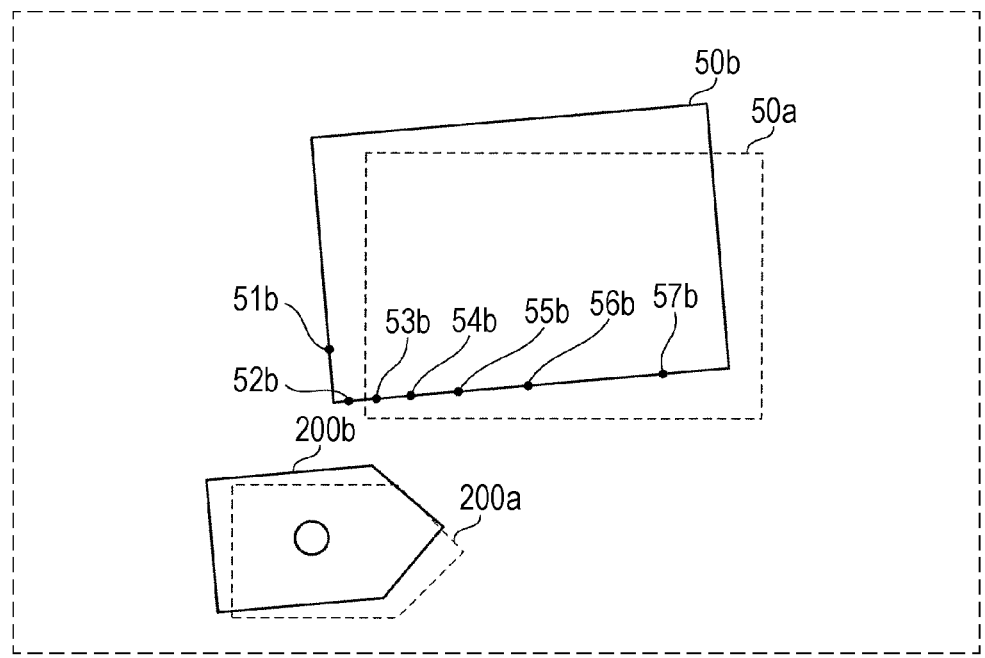
FIG. 13B is a diagram for explaining an effect that is brought about by running at a lower maximum speed or maximum acceleration in the detection mode.

FIGS. 13A and 13B are diagrams for explaining an effect that is brought about by running at a lower maximum speed or maximum acceleration in the detection mode.

FIGS. 13A and 13B are diagrams of a vehicle 200 and an object 50 as viewed from above. The vehicle 200 is simply illustrated for the purpose of orientation or the like. The LIDAR 26 of the vehicle 200 is located at the origin point of an x-y plane in FIG. 13A and emits a laser 360-degree all around. The laser is indicated by dashed lines. At this point in time, the LIDAR 26 detects, as a point cloud, the coordinates of each of the points 51 to 57, where the laser is reflected by the object 50. It should be noted that the coordinates thus detected are values based on the center coordinates of the LIDAR 26 of the vehicle 200, i.e. the origin point of the x-y plane, and are not coordinates on a map.

In order to update the map, it is necessary to find the coordinates of the points 51 to 57 on the map. The coordinates of the points 51 to 57 on the map can be found by performing coordinate transformation from a first coordinate system centered at the LIDAR 26 of the vehicle 200 into a second coordinate system on the map in consideration of the position and/or posture of the vehicle 200 on the map. The coordinate transformation involves the use of Formula 3.

$$(x_b, y_b, z_b, 1)^T = \begin{pmatrix} R & t \\ 0 & 1 \end{pmatrix} (x, y, z, 1)^T \quad (3)$$

$x_b$: x coordinate of point on second coordinate system
$y_b$: y coordinate of point on second coordinate system
$z_b$: z coordinate of point on second coordinate system
R: 3×3 rotation matrix of posture of vehicle 200 on second coordinate system
t: position $(x_c, y_c, z_c)$ T of vehicle 200 on second coordinate system
x: x coordinate of point on first coordinate system
y: y coordinate of point on first coordinate system
z: z coordinate of point on first coordinate system The position and/or posture of the vehicle 200 on the second coordinate system on the map is/are estimated by the aforementioned ICP or NDT algorithm. These algorithms have initial value dependence, as they are generally repetition algorithms. For this reason, in the estimation of the position and/or posture of the vehicle 200 with use of these algorithms, giving an inappropriate initial value leads to deterioration in estimation accuracy. In general, the position and/or posture at the current time or the position and/or posture at the next time as estimated from speed, acceleration, angular acceleration, and the like is/are used as an initial value(s), the accuracy deteriorates during sudden acceleration or quick turning.

Note here that, as shown in FIG. 13B, in a case where the vehicle 200 is located in a position 200a on the second coordinate system on the map but has been estimated to be located in a position 200b, coordinate values on the second coordinate system that are estimated from the points 51 to 57 on the first coordinate system detected as shown in FIG. 13A are points 51b to 57b. That is, there is a discrepancy between an estimated position 50b of the object 50 and an actual position 50a of the object 50.

That is, in a situation where the vehicle 200 is suddenly accelerating or decelerating, is quickly turning, or is oscillating a lot, there is a greater error in the estimation of the position and/or posture of the vehicle 200. Because of the greater error in the position and/or posture of the vehicle 200, there is also an error in the coordinate values of the object 50 estimated from a point cloud detected as described above. Accordingly, setting the maximum speed and the maximum acceleration lower makes it possible to improve the accuracy of estimation of the position and/or posture of the vehicle 200 on the second coordinate system and prevent an error from occurring in the coordinate values thus estimated.

Furthermore, as in the case of Formula 2, it is conceivable that the detection frequency of a sensor may be changed according to scores. For example, the LIDAR 26 has its laser light receiver and emitter rotating therein and can change the rotational frequency of the laser light receiver and emitter. The LIDAR 26 causes the light receiver and emitter to rotate at a higher rotational frequency and thereby allows detection data to detected at a higher temporal density. It should be noted that, in this case, there is a reduction in the number of points that are included in detection data that is obtained every time the light receiver and emitter makes a rotation, as the light receiver and emitter emits a laser in a constant cycle. However, in general, a point cloud included in detection data hardly has a harmful effect, as it is sampled down for use. Thus, increasing the rotational frequency of the light receiver and emitter of the LIDAR 26 makes it possible to improve the accuracy of an initial position that is given in matching process in estimating the position of the vehicle 200 by increasing the temporal density of detection data and makes it possible to improve the accuracy of estimation of the position of the vehicle 200.

Figure 14A:
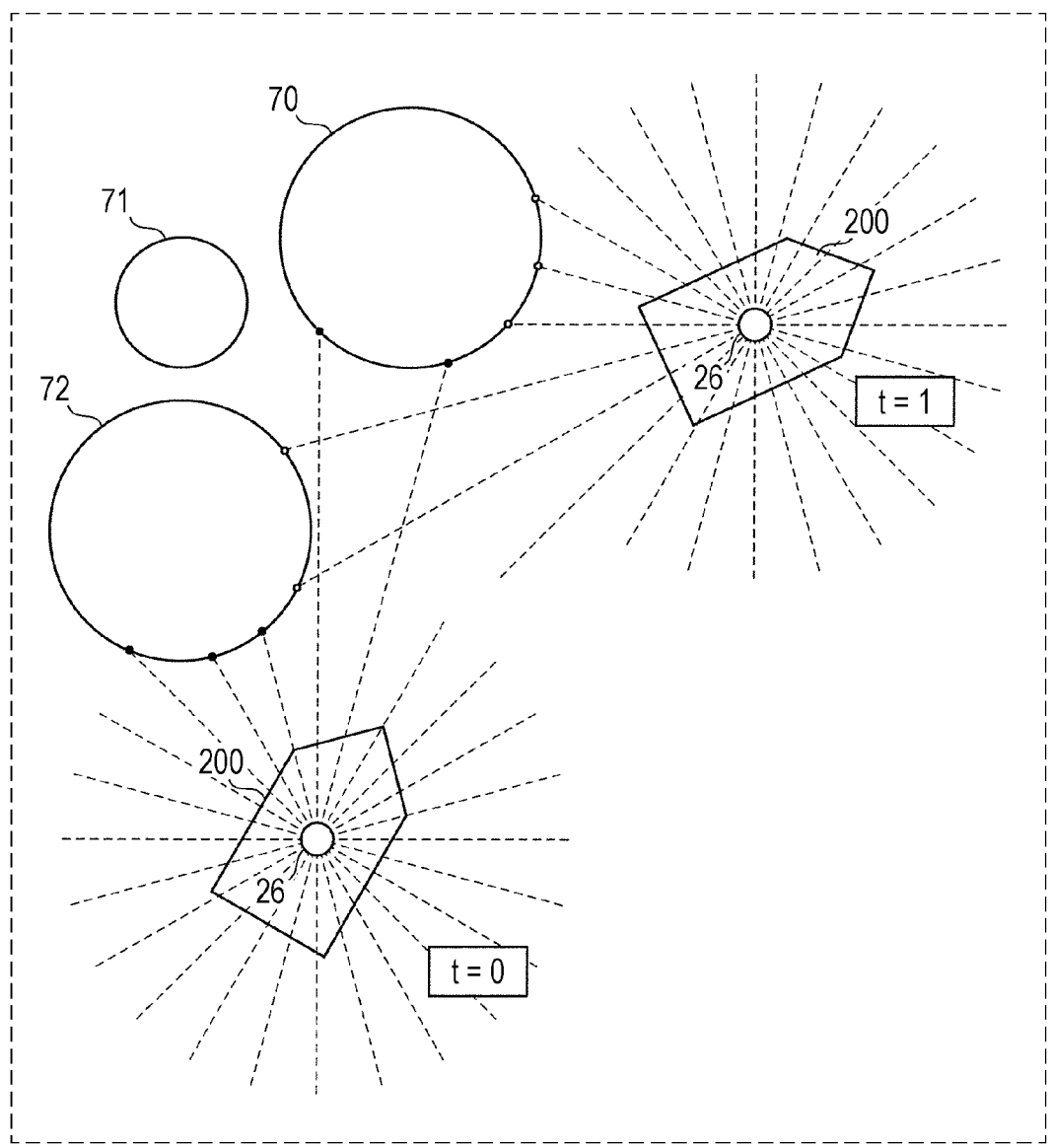
FIG. 14A is a diagram for explaining an effect of inhibiting the occurrence of occlusion by a plurality of objects.
Figure 14B:
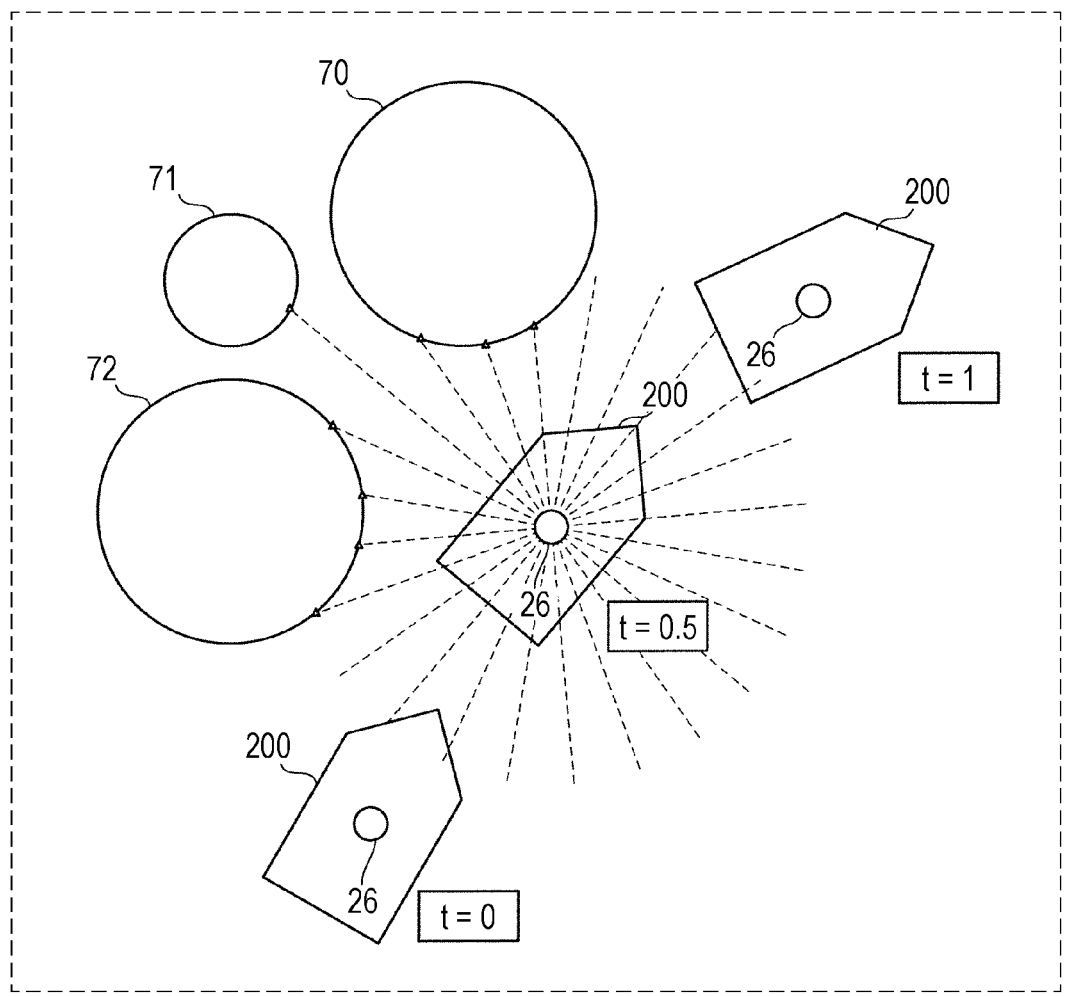
FIG. 14B is a diagram for explaining an effect of inhibiting the occurrence of occlusion by a plurality of objects.

FIGS. 14A and 14B are diagrams for explaining an effect of inhibiting the occurrence of occlusion by a plurality of objects.

In FIG. 14A, the LIDAR 26 of the vehicle 200 cannot detect an object 71 at either spot at time t=0 or t=1, as the object 71 is hidden behind objects 70 and 72. Note here that, as shown in FIG. 14B, the object 71 can be detected by doubling the rotational frequency of the LIDAR 26 to make detection possible also from the position at time t=0.5. It should be noted that the angular intervals of laser of the LIDAR 26 indicated by dashed lines in FIGS. 14A and 14B are schematic, and in actuality, they are not greater than 0.5 degree. Nevertheless, the object 71 cannot be detected from the position at time t=0 or t=1, as the object 71 is hidden behind the objects 70 and 72.

Although the foregoing has described the LIDAR 26 as an example, another sensor too is capable of changing its detection frequency. For example, the same as above applies even in a case where an object is detected with an imaging device such as a stereo camera.

1-4. Effects and the Like

The information processing apparatus 100 according to the present embodiment divides a three-dimensional map into a plurality of areas and determines, for each of the plurality of areas, whether it is necessary to update the map. Thus, the information processing apparatus 100 can efficiently determine an area where the map needs to be updated.

Further, the information processing apparatus 100 requests one or more vehicles 200 to detect detection data for an area where the map needs to be updated. Thus, since the information processing apparatus 100 selectively transmits a detection request to a vehicle 200 that is running or planning to run in an area where updating is needed, the information processing apparatus 100 can effectively acquire accurate detection data. For this reason, the information processing apparatus 100 can effectively update map data so that it becomes more accurate.

Further, in the information processing apparatus 100, the vehicle 200 is a vehicle that performs automatic driving. The predetermined action is at least one of sudden deceleration, sudden acceleration, manual driving interruption during the automatic driving, and quick avoidance that have occurred during a predetermined period of time up to the present time. That is, the information processing apparatus 100 determines that a larger number of occurrences of predetermined actions in a vehicle that performs automatic driving lead to a greater difference between a road shape shown by a map and an actual road shape. This is because a difference between a road shape shown by a map and an actual road shape leads to deterioration in accuracy of estimation of the position of the vehicle, thus making stable running control difficult. Thus, since the information processing apparatus 100 determines that a larger number of occurrences of predetermined actions in a vehicle that performs automatic driving lead to a greater difference between a road shape shown by a map and an actual road shape, the information processing apparatus 100 can effectively determine whether it is necessary to update the map.

Further, in the information processing apparatus 100, the selector 120 selects, as the detecting vehicle, a vehicle whose vehicle height is not lower than a predetermined height. This makes it possible to select a vehicle 200 that can detect the road shape with a high degree of accuracy.

Further, in the information processing apparatus 100, the selector 120 selects, as the detecting vehicle, a vehicle 200 having a sensor that detects the road shape and whose detection accuracy is not lower than a predetermined degree of accuracy. This makes it possible to select a vehicle 200 that can detect the road shape with a high degree of accuracy.

Further, in the information processing apparatus 100, the selecting 120 selects, as the detecting vehicle, a vehicle 200 that has ever run in a detection mode in which to detect the road shape in order to update the map. This makes it possible to select a vehicle that is highly likely to be able to run in the detection mode in which to detect the road shape with a high degree of accuracy. This makes it possible to reduce the time it takes to select a vehicle that run in the detection mode and the processing load on the selection.

Further, in the information processing apparatus 100, the first determiner 110 computes a score for each of the plurality of areas on the basis of at least either the amount of change in the road shape or the number of occurrences of predetermined actions. The first determiner 110 determines that it is necessary to update the three-dimensional map of that one of the plurality of areas where the score thus computed exceeds a predetermined score. This makes it possible to effectively and easily determine, for each of the plurality of areas, whether it is necessary to update the map of that area.

Further, in the information processing apparatus 100, the first determiner 110 increases a predetermined score of that one of the plurality of areas where the number of times it has been determined per unit period that updating is needed is not smaller than a first number of times and decreases a predetermined score of that one of the plurality of areas where the number of times it has been determined per unit period that updating is needed is smaller than a second number of times that is not larger than the first number of times. Thus, since the first determiner 110 changes, according to the number of times it was determined in the past whether updating is needed, a threshold score for determining whether it is necessary to update the map, an area with a greater time series variation in the road shape can be updated at a higher frequency. This makes it possible to update the map of the area at a frequency according to the time series variation in the road shape. This makes it possible to update the map of each of the plurality of areas at a frequency appropriate for that area.

Upon receiving a detection request, a vehicle 200 according to the present embodiment runs in a detection mode, different from a normal mode, in which to detect a road shape for use in updating of a map. For this reason, the vehicle 200 can detect the road shape with a high degree of accuracy. Further, even upon receiving a detection request from an information processing apparatus, the vehicle 200 keeps running in the normal mode without switching to the detection mode, depending on the situation of the vehicle 200; therefore, the vehicle 200 can inhibit impairment of convenience for a user of the vehicle 200.

Further, in the vehicle 200, the second communicator 210 transmits, via the communication network 300 to the information processing apparatus 100, detection data indicating the road shape detected by the first detector 250. For this reason, the vehicle 200 can transmit, to the information processing apparatus 100, detection data detected with a high degree of accuracy in an area where the map needs to be updated.

Further, in the vehicle 200, the detection mode is a running mode in which to run in a state of change in at least one of the settings of making the maximum running speed lower, making the maximum running acceleration lower, making the intervehicular distance larger, or making the first detector 250 perform detection at a higher detection frequency than in the normal mode. For this reason, the vehicle 200 can detect the road shape with a high degree of accuracy in the detection mode.

Further, the vehicle 200 further includes a second detector 280 that detects a following vehicle falling within a certain distance from the vehicle 200. In a case where the switcher 230 has switched the running mode to the detection mode, the controller 240 causes the vehicle 200 to run in the normal mode when the second detector 280 is detecting a following vehicle. For this reason, even in a case where the running mode has been switched to the detection mode, the vehicle 200 can run out of the way of a following vehicle in a case where the second detector 280 has detected the following vehicle.

Further, the vehicle 200 further includes a congestion detector 290 that detects an occurrence of congestion in an area around the vehicle 200. In a case where the switcher 230 has switched the running mode to the detection mode, the controller 240 causes the vehicle 200 to run in the normal mode when the congestion detector 290 is detecting an occurrence of congestion. For this reason, even in a case where the running mode has been switched to the detection mode, the vehicle 200 can run out of the way of a stuck vehicle in a case where an area around the vehicle 200 is congested.

Further, the vehicle 200 further includes an input receiver 270 that receives an input indicating whether to give approval to switch the running mode from the normal mode to the detection mode. In a case where an input received by the input receiver 270 indicates approval, the second determiner 220 determines that the running mode is switched, and in a case where an input received by the input receiver 270 indicates disapproval, the second determiner 220 determines that the running mode is not switched. For this reason, since, in the absence of approval from a person who is in the vehicle interior, the vehicle 200 runs in the normal mode without switching the running mode, the vehicle 200 can inhibit impairment of convenience for the person.

The vehicle 200 is a vehicle that carries a passenger. Further, in a case where the vehicle 200 is not on its way to pick up the passenger and the vehicle 200 is not carrying the passenger, the second determiner 220 determines that the running mode is switched. In a case where the vehicle 200 is on its way to pick up the passenger or the vehicle 200 is carrying the passenger, the second determiner 220 determines that the running mode is not switched. For this reason, since, in a case where the vehicle 200 is on its way to pick up the passenger or is carrying the passenger, the vehicle 200 runs while keeping the running mode in the detection mode, the vehicle 200 can inhibit impairment of convenience for the passenger.

1-5. Modifications

Although the foregoing embodiment assumes that the LIDAR 26 is used to detect a three-dimensional shape of a terrain surface of an area around the vehicle 200, this does not imply any limitation. For example, a stereo camera may be used to detect a three-dimensional shape of a terrain surface of an area around the vehicle 200 from an image taken by the stereo camera, or a combination of a distance sensor and a camera may be used to detect a three-dimensional shape of a terrain surface of an area around the vehicle 200 from a result of detection yielded by the distance sensor and an image taken by the camera.

Although the foregoing embodiment assumes that a three-dimensional map showing a road and a three-dimensional shape of an area around the road is used as a map, a two-dimensional map showing a road and a two-dimensional shape of an area around the road may alternatively be used. In this case, the first detector 250, which is realized by the LIDAR 26 and the like, may detect a road around the vehicle 200 and a road shape, i.e. a shape of an area around the road, in two-dimensional shapes, although the foregoing embodiment assumes that the first detector 250 detects them in three-dimensional shapes. The first detector 250 may also perform two-dimensional shape detection by transforming a road shape detected in a three-dimensional shape into a two-dimensional shape.

The foregoing embodiment assumes that the vehicle 200 is configured such that in a case where the switcher 230 has switched the running mode to the detection mode, the controller 240 causes the vehicle 200 to run in the normal mode when the second detector 280 is detecting a following vehicle. However, in a case where the second detector 280 has detected a following vehicle after reception of a detection request from the information processing apparatus 100, the second determiner 220 may determine that the running mode is not switched to the detection mode.

The foregoing embodiment assumes that the vehicle 200 is configured such that in a case where the switcher 230 has switched the running mode to the detection mode, the controller 240 causes the vehicle 200 to run in the normal mode when the congestion detector 290 is detecting an occurrence of congestion in an area around the vehicle 200. However, in a case where the congestion detector 290 has detected an occurrence of congestion in an area around the vehicle 200 after reception of a detection request from the information processing apparatus 100, the second determiner 220 may determine that the running mode is not switched to the detection mode.

It should be noted that the foregoing embodiment may be configured such that the information processing apparatus 100, a service server, or the like includes such a service that in a case where a vehicle 200 having received a detection request that causes a detection vehicle selected by the information processing apparatus 100 to detect the road shape of an area changes its running mode from the normal mode to the detection mode, remuneration is given to an owner of the vehicle 200 or a person who is on board the vehicle 200. The remuneration here may be giving money or granting bonus point service.

The information processing apparatus 100 can uniquely identify a vehicle 200. Therefore, for example, in a case where the vehicle 200 is a self-guided taxi, an example of a service in a case where a passenger who is on board the vehicle 200 gives approval to change the running mode may be a mechanism by which a terminal attached to the vehicle 200 displays a particular QR code (registered trademark), the passenger then scans the QR code (registered trademark) with his/her own smartphone or the like, the smartphone or the like transmits, to the information processing apparatus 100 or the service server, information indicating the approval to change the running mode, and the passenger thereby obtains the remuneration; that is, the information processing apparatus 100 gives the remuneration to the passenger. Alternatively, an account of an owner may be associated with each vehicle 200, and information indicating approval to change the running mode may be stored in the account.

Giving remuneration entices more vehicles to give approval to change their running mode from the normal mode to the detection mode, making it possible to gather more accurate data.

It should be noted that, in each of the embodiments, each constituted element may be configured by dedicated hardware or realized by executing a software program suited to that constituted element. Each constituent element may be realized by a program executor such as a CPU or a processor reading out a software program stored on a recording medium such as a hard disk or a semiconductor memory. Note here that a software that realizes the information processing method, the running control method, the map updating method, and the like according to each of the embodiments is the following program.

That is, this program causes a computer to execute an information processing method that is executed by an information processing apparatus for distributing, to a vehicle, a map showing a road on which the vehicle runs and a road shape that is a shape of an area around the road, including: determining, for each of the plurality of areas, whether it is necessary to update the map of that area, the determining being based on at least either an amount of change from the road shape shown by the map to the road shape of a present time or the number of occurrences of a predetermined action of a vehicle having run through that area, the map being stored in a memory of the information processing apparatus.

Further, this program causes a computer to execute a running control method that is executed by a vehicle, including: detecting a road on which the vehicle runs and a road shape that is a shape of an area around the road; receiving, via a communication network from an external information apparatus, a detection request to detect the road shape; determining whether a running mode of the vehicle is switched from a normal mode in which to perform normal running to a detection mode in which to, in order to update the map, perform running that detects the road shape of a road on which the vehicle is running; in a case where it has been determined that switching to the detection mode is made, switching the running mode to the detection mode and controlling the vehicle to run in the detection mode; and in a case where it has been determined that switching to the detection mode is not made, keeping the running mode in the detection mode and controlling the vehicle to run in the normal mode.

Further, this program causes a computer to execute a map updating method including updating a map in a map updating system including an information processing apparatus for distributing, to one or more vehicles, the map showing a road on which the one or more vehicles run and a road shape that is a shape of an area around the road and the one or more vehicles, wherein the information processing apparatus performs operations including: determining, for each of the plurality of areas, whether it is necessary to update the map of that area, the determining being based on at least either an amount of change from the road shape shown by the map to the road shape of a present time or the number of occurrences of a predetermined action of a vehicle having run through that area, the map being stored in a memory of the information processing apparatus; selecting, from among one or more vehicles that are running or planning to run in an area where it has been determined that the map needs to be updated, a detection vehicle that detects the road shape with a high degree of accuracy; and transmitting, via a communication network to the detecting vehicle thus selected, a detection request that causes the detecting vehicle to detect the road shape of the area, and a vehicle selected as the detecting vehicle from among the one or more vehicles performs operations including: receiving the detection request via the communication network from an external information apparatus; determining whether a running mode of the vehicle is switched from a normal mode in which to perform normal running to a detection mode in which to, in order to update the map, perform running that detects the road shape of a road on which the vehicle is running; in a case where it has been determined that switching to the detection mode is made, switching the running mode to the detection mode and controlling the vehicle to run in the detection mode; and in a case where it has been determined that switching to the detection mode is not made, keeping the running mode in the detection mode and controlling the vehicle to run in the normal mode.

Although the foregoing has described an information processing apparatus, a vehicle, an information processing method, a running control method, a map updating method, and the like according to one more aspects with reference to embodiments, the present disclosure is not limited to these embodiments. Embodiments based on the application to the present embodiment of various modifications conceived of by persons skilled in the art and embodiments based on combinations of constituent elements of different embodiments are encompassed in the scope of the one or more aspects, provided such embodiments do not depart from the spirit of the present disclosure.

The present disclosure is useful as an information processing apparatus, a vehicle, an information processing method, a running control method, a map updating method, and the like that make it possible to update map data so that it becomes more accurate.

What is claimed is:

1. An information processing apparatus, comprising:
a communication circuit configured to communicate with a vehicle;
a processor; and
a non-transitory recording medium storing thereon
(i) a map divided into a plurality of areas, the map showing:
a road, and
a road shape that is a shape of an area around the road, and (ii) a computer program, which when executed by the processor, causes the processor to perform operations including:
acquiring, via one or more sensors of the vehicle, sensing data indicating a road shape of the area around the road on which the vehicle runs;
determining whether the vehicle is in an autonomous mode;
determining, for each of the plurality of areas, whether it is necessary to update the map for navigating in each of the plurality of areas,
wherein the determining of whether it is necessary to update the map for navigating is based on:
a score based on $$S = \alpha \frac{\sum_i c_i}{P} T + \sum_j \beta_j p_j$$

formula, wherein S denotes the score, $c_i$ denotes an amount of change in past update score, P denotes a predetermined period of time preceding a last update time, T denotes time elapsed since the last update time up to a current time, $p_j$ denotes a number of occurrences of various events, and $\alpha$ and $\beta_j$ denote coefficients,
a number of a plurality of interventions performed that disrupt planned autonomous driving operations while the vehicle is in the autonomous mode, and
at least one of
an amount of change, in each of the plurality of areas, from the road shape shown by the stored map to the road shape acquired by the vehicle, and
a number of occurrences of a predetermined action of a vehicle having run through in each of the plurality of areas;
updating the map for at least one area among the plurality of areas when it is determined that it is necessary to update the map; and
transmitting, via the communication circuit and to the vehicle, the updated map,
wherein the occurrences include a driver intervention operation of the vehicle and an autonomous operation performed by the vehicle.

2. The information processing apparatus according to claim 1, wherein the operations further include:
determining available vehicles that are traveling or are planning to travel in an identified area of the map;
selecting at least one detecting vehicle that detects the road shape from among one or more of the available vehicles that are traveling or planning to travel in the identified area where it has been determined that the map needs to be updated; and
transmitting, via the communication circuit, a detection request that causes the selected detecting vehicle to obtain sensing data for detecting the road shape of the identified area for updating the map, to the selected detecting vehicle via a communication network.

3. The information processing apparatus according to claim 2, wherein the vehicle is a vehicle configured to perform automatic driving, and
the predetermined action is at least one of (i) sudden deceleration, (ii) sudden acceleration, (iii) manual driving interruption during the automatic driving, and (iv)

quick avoidance, that have occurred during a predetermined period of time up to the current time.

4. The information processing apparatus according to claim 2, wherein the selecting includes selecting, as the detecting vehicle, a vehicle whose vehicle height is not lower than a predetermined height.

5. The information processing apparatus according to claim 2, wherein the selecting includes selecting, as the detecting vehicle, a vehicle having a sensor configured to detect the road shape and whose detection accuracy is not lower than a predetermined degree of accuracy.

6. The information processing apparatus according to claim 2, wherein the selecting includes selecting, as the detecting vehicle, a vehicle that has ever run in a detection mode in which to detect the road shape in order to update the map.

7. The information processing apparatus according to claim 1, wherein the determining includes:
computing a score for each of the plurality of areas using at least one of (i) the amount of change and (ii) the number of occurrences; and
determining that it is necessary to update the map of one of the plurality of areas whose computed score exceeds a predetermined score.

8. The information processing apparatus according to claim 1, wherein the determining includes:
increasing a predetermined score of one of the plurality of areas where the number of times it has been determined per unit period that updating is needed is not smaller than a first number of times; and
decreasing the predetermined score of that one of the plurality of areas where the number of times it has been determined per unit period that updating is needed is smaller than a second number of times that is not larger than the first number of times.

9. The information processing apparatus according to claim 1, wherein the processor determines that it is necessary to update the map if the number of the plurality of interventions performed that disrupt planned autonomous driving operations is greater than a predetermined threshold.

10. The information processing apparatus according to claim 1, wherein the determining of whether updating of the map is necessary for a particular area is based on the number of the plurality of interventions performed that disrupt planned autonomous driving operations by a plurality of cars that passes through the particular area.

11. A map updating system comprising:
a vehicle; and
an information processing apparatus,
wherein the vehicle comprises:
one or more sensors;
a processor; and
a memory storing thereon a computer program, which when executed by the processor of the vehicle, causes the processor of the vehicle to perform operations including:
acquiring, via the one or more sensors of the vehicle, sensing data indicating a road shape of an area around a road on which the vehicle runs;
determining whether the vehicle is an autonomous mode;
detecting (i) the road on which the vehicle runs, and (ii) the road shape that is a shape of the area around the road based on the acquired sensing data;
receiving a detection request to detect the road shape from the information processing apparatus via a communication network;
upon receiving the detection request, determining whether a running mode of the vehicle is switched from a normal mode in which to perform normal running to a detection mode in which to, in order to update a map for navigating, perform running that detects the road shape of the road on which the vehicle is running;
in a case where it is determined that the running mode is switched to the detection mode, switching the running mode to the detection mode and controlling the vehicle to run in the detection mode; and
in a case where it is determined that the running mode is not switched, keeping the running mode in the normal mode and controlling the vehicle to run in the normal mode,
wherein the information processing apparatus comprises:
a communication circuit configured to communicate with the vehicle;
a processor; and
a non-transitory recording medium storing thereon
(i) the map for navigating, the map being divided into a plurality of areas, the map showing:
a road, and
a road shape that is a shape of an area around the road, and
(ii) a computer program, which when executed by the processor of the information processing apparatus, causes the processor of the information processing apparatus to perform operations including:
determining, for each of the plurality of areas, whether it is necessary to update the map for navigating in each of the plurality of areas,
wherein the determining of whether it is necessary to update the map for navigating is based on:
a score based on $$S = \alpha \frac{\sum_i c_i}{P} T + \sum_j \beta_j p_j$$

formula, wherein S denotes the score, $c_i$ denotes an amount of change in past update score, P denotes a predetermined period of time preceding a last update time, T denotes time elapsed since the last update time up to a current time, $p_j$ denotes a number of occurrences of various events, and $\alpha$ and $\beta_j$ denote coefficients,
a number of a plurality of interventions performed that disrupt planned autonomous driving operations while the vehicle is in the autonomous mode, and
at least one of
an amount of change, in each of the plurality of areas, from the road shape shown by the stored map to the road shape acquired by the vehicle, and
a number of occurrences of a predetermined action of a vehicle having run through in each of the plurality of areas;
updating the map for at least one area among the plurality of areas when it is determined that it is necessary to update the map; and
transmitting, via the communication circuit and to the vehicle, the updated map, wherein the occurrences include a driver intervention operation of the vehicle and an autonomous operation performed by the vehicle.

12. The map updating system according to claim 11, the operation further comprising:
transmitting detection data indicating the detected road shape to the information processing apparatus via the communication network.

13. The map updating system according to claim 11, wherein the detection mode is a running mode in which to run in a state of change in at least one of (i) settings of making a maximum running speed lower, (ii) making a maximum running acceleration lower, (iii) making an intervehicular distance larger, and (iv) making a detection frequency higher than in the normal mode.

14. The map updating system according to claim 13, wherein the operations further include:
detecting a following vehicle which is within a certain distance from the vehicle; and
in a case where the running mode is switched to the detection mode and the following vehicle is detected, controlling the vehicle to run in the normal mode.

15. The map updating system according to claim 13, wherein the operations further include:
detecting a congestion in an area around the vehicle; and
in a case where the running mode is switched to the detection mode and the congestion is detected, controlling the vehicle to run in the normal mode.

16. The map updating system according to claim 11, wherein the operations further include receiving an input indicating whether to give approval to switch the running mode from the normal mode to the detection mode, and
the determining includes, in a case where the input indicates approval, determining that the running mode is switched and, in a case where the input indicates disapproval, determining that the running mode is not switched.

17. The map updating system according to claim 11, wherein the vehicle is a vehicle that carries a passenger, and
the determining includes, in a case where the vehicle is not on its way to pick up the passenger and the vehicle is not carrying the passenger, determining that the running mode is switched and, in a case where the vehicle is on its way to pick up the passenger or the vehicle is carrying the passenger, determining that the running mode is not switched.

18. An information processing method, comprising:
storing, in a memory, a map divided into a plurality of areas, the map showing (i) a road, and (ii) a road shape that is a shape of an area around the road;
acquiring, via one or more sensors of a vehicle, sensing data indicating a road shape of the area around the road on which the vehicle runs;
determining whether the vehicle is in an autonomous mode;
determining, by a processor for each of the plurality of areas, whether it is necessary to update the map for navigating in each of the plurality of areas, wherein the determining of whether it is necessary to update the map for navigating is based on;
a score based on $$S = \alpha \frac{\sum_i c_i}{P} T + \sum_j \beta_j p_j$$

formula, wherein S denotes the score, $c_i$ denotes an amount of change in past update score, P denotes a predetermined period of time preceding a last update time, T denotes time elapsed since the last update time up to a current time, $p_j$ denotes a number of occurrences of various events, and $\alpha$ and $\beta_j$ denote coefficients,
a number of a plurality of interventions performed that disrupt planned autonomous driving operations while the vehicle is in the autonomous mode, and
at least one of
an amount of change from the road shape shown by the stored map to the road shape acquired by the vehicle in each of the plurality of areas, and
a number of occurrences of a predetermined action of a vehicle having run through in each of the plurality of areas; and
updating the map for at least one area among the plurality of areas when it is determined that it is necessary to update the map; and
transmitting, via a communication network and to the vehicle, the updated map,
wherein the occurrences include a driver intervention operation of the vehicle and an autonomous operation performed by the vehicle.

19. A map updating method comprising updating a map in a map updating system including:
an information processing apparatus for
storing, in a memory, a map divided into a plurality of areas, the map showing (i) a road, and (ii) a road shape that is a shape of an area around the road, and
distributing, to one or more vehicles, the stored map, and the one or more vehicles,
wherein the information processing apparatus performs operations including:
determining whether the vehicle is in an autonomous mode;
determining, for each of the plurality of areas, whether it is necessary to update the map for navigating of that area,
wherein the determining of whether it is necessary to update the map for navigating is based on:
a score based on $$S = \alpha \frac{\sum_i c_i}{P} T + \sum_j \beta_j p_j$$

formula, wherein S denotes the score, $c_i$ denotes an amount of change in past update score, P denotes a predetermined period of time preceding a last update time, T denotes time elapsed since the last update time up to a current time, $p_j$ denotes a number of occurrences of various events, and $\alpha$ and $\beta_j$ denote coefficients,
a number of a plurality of interventions performed that disrupt planned autonomous driving operations while the vehicle is in the autonomous mode, and
at least either
an amount of change from the road shape shown by the stored map to the road shape detected by a vehicle using one or more sensors, and
a number of occurrences of a predetermined action of the vehicle having run through that area, wherein the occurrences include a driver intervention operation of the vehicle and an autonomous operation performed by the vehicle independent of a driver of the vehicle;

selecting, from among one or more vehicles that are running or planning to run in an area where it has been determined that the map needs to be updated, a detection vehicle that detects the road shape; and transmitting, via a communication network to the detecting vehicle thus selected, a detection request that causes the detecting vehicle to detect the road shape of the area, and the detecting vehicle performs operations including:

receiving the detection request via the communication network from an external information apparatus;

determining whether a running mode of the detecting vehicle is switched from a normal mode in which to perform normal running to a detection mode in which to, in order to update the map, perform running that detects the road shape of a road on which the detecting vehicle is running;

in a case where it has been determined that switching to the detection mode is made, switching the running mode to the detection mode and controlling the detecting vehicle to run in the detection mode; and in a case where it has been determined that switching to the detection mode is not made, keeping the running mode in the detection mode and controlling the detecting vehicle to run in the normal mode.

\* \* \* \* \*